(12) United States Patent
Parekh

(10) Patent No.: US 12,490,986 B2
(45) Date of Patent: Dec. 9, 2025

(54) METHODS FOR SURGICAL ACHILLES TENDON REPAIR

(71) Applicant: TheraPod Rehab, LLC, Durham, NC (US)

(72) Inventor: Selene G. Parekh, Durham, NC (US)

(73) Assignee: TheraPod Rehab, LLC., Durham, NC (US)

( * ) Notice: Subject to any disclaimer, the term of this patent is extended or adjusted under 35 U.S.C. 154(b) by 357 days.

(21) Appl. No.: 18/337,215

(22) Filed: Jun. 19, 2023

(65) Prior Publication Data

US 2023/0404588 A1 Dec. 21, 2023

Related U.S. Application Data

(60) Provisional application No. 63/353,740, filed on Jun. 20, 2022.

(51) Int. Cl.
*A61B 17/11* (2006.01)
*A61B 17/06* (2006.01)
*A61B 17/00* (2006.01)

(52) U.S. Cl.
CPC .... *A61B 17/1146* (2013.01); *A61B 17/06166* (2013.01); *A61B 2017/00004* (2013.01)

(58) Field of Classification Search
CPC .......... A61B 17/1146; A61B 17/06166; A61B 2017/00004; A61B 17/282; A61B 17/0482; A61B 2017/1132; A61B 2017/2808; A61B 17/28
See application file for complete search history.

(56) References Cited

U.S. PATENT DOCUMENTS 5,586,564 A * 12/1996 Barrett ................ A61B 17/025
606/167

* cited by examiner

*Primary Examiner* — Richard G Louis
(74) *Attorney, Agent, or Firm* — NK Patent Law

(57) ABSTRACT

A method for repairing an Achilles tendon without an instrument guide to reduce nerve damage and improve the recovery of the tendon. The method includes a limited open incision technique with a posterior midline approach and a plurality of sutures with varying orientations to repair a ruptured Achilles tendon of a prone patient.

20 Claims, 18 Drawing Sheets

METHODS FOR SURGICAL ACHILLES TENDON REPAIR

CROSS-REFERENCE TO RELATED APPLICATIONS

The present application claims the benefit of U.S. Provisional Patent Application No. 63/353,740, filed Jun. 20, 2022, the entire content of which is incorporated by reference herein in its entirety.

FIELD OF THE INVENTION

The present invention is generally directed to the field of surgical tendon repair, more specifically to the surgical repair of an Achilles tendon.

DESCRIPTION OF RELATED ART

Operative treatment for Achilles tendon ruptures includes open incision, percutaneous incision, and limited open incision techniques. The open incision technique allows for optimal visualization of the injured tendon, but there are concerns about wound complications following open approaches. In comparison, percutaneous Achilles repairs have been shown to have favorable results with decreased wound complications. However, percutaneous Achilles repairs can cause sural nerve entrapment and inadequate tendon repair integrity. The mini-open Achilles repair technique includes using a limited incision for direct exposure and repair of the ruptured Achilles tendon ends.

BRIEF SUMMARY

According to one embodiment of the present invention, a method for surgically repairing a tendon using anchors is disclosed. The method of surgically repairing a tendon including placing a tourniquet around an extremity of a person, the extremity of the person including a ruptured tendon. First, inflating the tourniquet, creating a first incision over a midline of a tear of the ruptured tendon, removing adhesion and scar tissue from the ruptured tendon, and engaging a proximal stump of the ruptured tendon with at least one clamp. Next, running a first plurality of sutures through the ruptured tendon, wherein the first plurality of sutures runs from a proximal side of the ruptured tendon to a distal side of the ruptured tendon, and wherein the first plurality of sutures runs from a top of the proximal stump to a bottom of the proximal stump. Then, applying tension on the first plurality of sutures to create tension on the ruptured tendon, followed by inserting a second plurality of sutures through the ruptured tendon, wherein the second plurality of sutures runs through a medial side and a lateral side of the proximal stump, wherein the second plurality of sutures is positioned to exit a mid-substance of the proximal stump. Afterward. running a third plurality of sutures in a non-locking manner across a distal stump of the ruptured tendon, wherein the third plurality of sutures is inserted on a distal side of the distal stump and exits on a proximal side of the distal stump, creating a second incision in a posterior compartment of the ruptured tendon. Then, plantarflexing a foot of the extremity, tying the third plurality of sutures sequentially from a first suture to a second suture, wherein the first suture is a suture of the third plurality of sutures that is furthest from the ruptured tendon, wherein the second suture is a suture of the third plurality of sutures that is closest to the ruptured tendon, running the second plurality of sutures from a tip of the distal stump to a rupture site of the ruptured tendon, wherein the second plurality of sutures is run in a medial direction and a lateral direction, and creating a third incision in a medial direction and a lateral direction at an insertion junction, wherein the insertion junction is where the ruptured tendon inserts into a calcaneus. Next, running a box suture from a proximal medial side of the ruptured tendon to a distal medial side of the ruptured tendon, wherein the box suture further runs to a distal lateral side of the ruptured tendon and to a proximal lateral side of the ruptured tendon, wherein the box suture further runs to the proximal medial side of the ruptured tendon, tying the box suture, irrigating the ruptured tendon, closing the first incision with a first incision suture, inserting a second incision suture to close a subcutaneous area around the ruptured tendon; and inserting staples into skin surrounding the tendon.

According to another embodiment of the present invention, a method for surgically repairing a tendon without using anchors is disclosed. The tendon repair method including placing a tourniquet around an extremity of a person, the extremity of the person including a ruptured tendon, inflating the tourniquet, creating a first incision over a midline of a tear of the ruptured tendon, removing adhesion and scar tissue from the ruptured tendon, engaging a proximal stump of the ruptured tendon with at least one clamp, running a first plurality of sutures through the ruptured tendon, wherein the first plurality of sutures runs from a proximal side of the ruptured tendon to a distal side of the ruptured tendon, wherein the first plurality of sutures run from a top of the proximal stump to a bottom of the proximal stump, applying tension on the first plurality of sutures to create tension on the ruptured tendon, inserting a second plurality of sutures through the tendon, wherein the second plurality of sutures runs through a medial side of the proximal stump and a lateral side of the proximal stump, wherein the second plurality of sutures are positioned to exit a mid-substance of the proximal stump, running a third plurality of sutures in a non-locking manner across a distal stump of the ruptured tendon, wherein the third plurality of sutures is inserted on a distal side of the distal stump and exits on a proximal side of the distal stump, creating a second incision in a posterior compartment of the ruptured tendon, plantarflexing a foot of the ruptured tendon, tying the third plurality of sutures sequentially from a first suture to a second suture, wherein the first suture is a suture of the third plurality of sutures that is furthest from the ruptured tendon, wherein the second suture is a suture of the third plurality of sutures that is closest to the ruptured tendon, running the second plurality of sutures in a lateral direction from a tip of the distal stump of the ruptured tendon to a rupture site of the ruptured tendon, creating a third incision in a medial direction and a lateral direction at an insertion junction, wherein the insertion junction is where the ruptured tendon inserts into a calcaneus, running the second plurality of sutures through the third incision, wherein the second plurality of sutures further runs through the ruptured tendon, wherein the second plurality of sutures exits through the first incision and runs back up the medial side of the ruptured tendon, wherein the second plurality of sutures are tied at the rupture site, running a box suture from a proximal medial side of the ruptured tendon to a distal medial side of the ruptured tendon, wherein the box suture further passes to a distal lateral side of the ruptured tendon and to a proximal lateral side of the ruptured tendon, wherein the box suture is passed to the proximal medial side of the ruptured tendon, tying the box suture, irrigating the ruptured tendon, closing the first incision with a first incision suture, closing subcutaneous tissue around the ruptured tendon with a subcutaneous suture, and inserting staples into skin surrounding the ruptured tendon.

In yet another embodiment of the present invention, a method for surgically repairing an Achilles tendon is disclosed. The tendon repair method including placing a tourniquet around an extremity of a person, the extremity of the person including a ruptured Achilles tendon, inflating the tourniquet, creating a first incision over a midline of a tear of the ruptured Achilles tendon, removing adhesion and scar tissue from the ruptured Achilles tendon, engaging a proximal stump of the ruptured Achilles tendon with at least one clamp, running a first plurality of sutures through the ruptured Achilles tendon, wherein the first plurality of sutures runs from a proximal side of the ruptured Achilles tendon to a distal side of the ruptured Achilles tendon, wherein the first plurality of sutures run from a top of the proximal stump to a bottom of the proximal stump, applying tension on the first plurality of sutures to create tension on the ruptured Achilles tendon, inserting a second plurality of sutures through the ruptured Achilles tendon, wherein the second plurality of sutures runs through a medial side and a lateral side of the proximal stump, wherein the second plurality of sutures are positioned to exit a mid-substance of the proximal stump, running a third plurality of sutures in a non-locking manner across a distal stump of the ruptured Achilles tendon, wherein the third plurality of sutures is inserted on a distal side of the distal stump and exits on a proximal side of the distal stump, creating a second incision in a posterior compartment of the ruptured Achilles tendon, plantarflexing a foot of the extremity, tying the third plurality of sutures sequentially from a first suture to a second suture to create a plurality of knots, wherein the first suture is a suture of the third plurality of sutures that is furthest from the ruptured Achilles tendon, wherein the second suture is a suture of the third plurality of sutures that is closest to the ruptured Achilles tendon, wherein at least one knot of the plurality of knots is positioned near a rupture site, running the second plurality of sutures from a tip of the distal stump to the rupture site in a medial direction and a lateral direction, creating a third incision in a medial direction and a lateral direction at an insertion junction, wherein the insertion junction is where the ruptured Achilles tendon inserts into a calcaneus, inserting an anchor at the calcaneus, wherein the anchor is positioned through each of the first incision, the second incision, and the third incision, running a box suture from a proximal medial side of the ruptured Achilles tendon to a distal medial side of the ruptured Achilles tendon, wherein the box suture further runs to a distal lateral side of the ruptured Achilles tendon and to a proximal lateral side of the ruptured Achilles tendon, wherein the box suture is further passed to the proximal medial side of the ruptured Achilles tendon, tying the box suture, irrigating the ruptured Achilles tendon, closing the first incision with a first incision suture, closing subcutaneous tissue around the ruptured Achilles tendon with a subcutaneous suture, and inserting staples into skin surrounding the ruptured Achilles tendon.

BRIEF DESCRIPTION OF THE SEVERAL VIEWS OF THE DRAWINGS

The embodiments illustrated, described, and discussed herein are illustrative of the present invention. As these embodiments of the present invention are described with reference to illustrations, various modifications, or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION

Figure 1A:
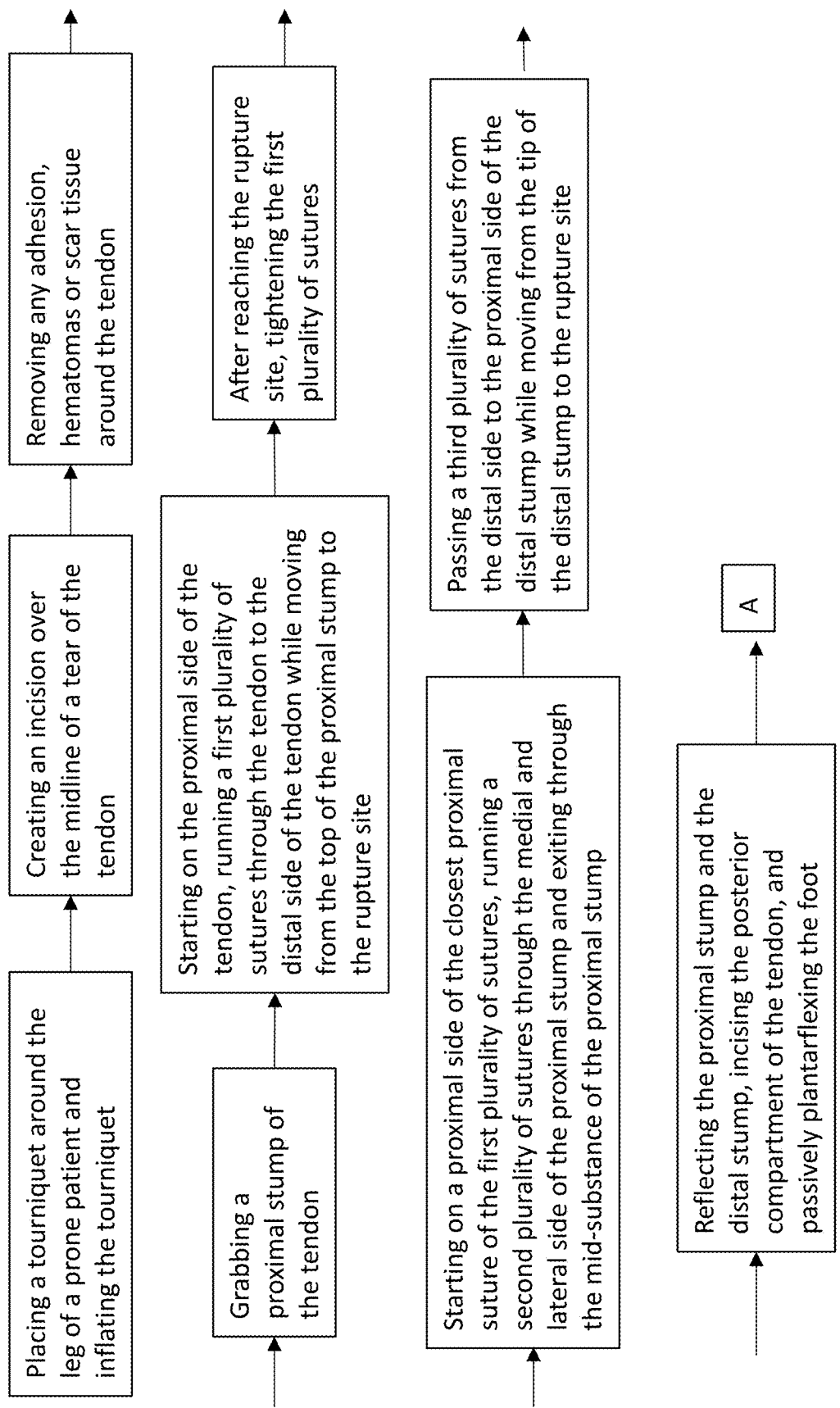
FIG. 1A illustrates a flow diagram of a surgical repair of an Achilles tendon according to one embodiment of the present invention.

For the purposes of promoting an understanding of the present disclosure, reference will be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "a composite" means at least one composite and can include more than one composite.

Throughout the specification, the terms "about" and/or "approximately" may be used in conjunction with numerical values and/or ranges. The term "about" is understood to mean those values near to a recited value. For example, "about 40 [units]" may mean within +/−25% of 40 (e.g., from 30 to 50), within +/−20%, +/−15%, +/−10%, +/−9%, +/−8%, +/−7%, +/−6%, +/−5%, +/−4%, +/−3%, +/−2%, +/−1%, less than +/−1%, or any other value or range of values therein or there below. Furthermore, the phrases "less than about [a value]" or "greater than about [a value]" should be understood in view of the definition of the term "about" provided herein. The terms "about" and "approximately" may be used interchangeably.

As used herein, the verb "comprise" as is used in this description and in the claims and its conjugations are used in its non-limiting sense to mean that items following the word are included, but items not specifically mentioned are not excluded.

Throughout the specification the word "comprising," or variations such as "comprises" or "comprising," will be understood to imply the inclusion of a stated element, integer or step, or group of elements, integers, or steps, but not the exclusion of any other element, integer or step, or group of elements, integers or steps. The present disclosure may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only", and the like in connection with the recitation of claim elements, or the use of a "negative" limitation.

Unless defined otherwise, all technical and scientific terms used herein have the same meanings as commonly understood by one of ordinary skill in the art to which this disclosure belongs. Preferred methods, devices, and materials are described, although any methods and materials similar or equivalent to those described herein can be used in the practice or testing of the present disclosure. All references cited herein are incorporated by reference in their entirety.

The subject matter described herein includes methods for surgically repairing a tendon. According to one embodiment of the present invention, a method of surgically repairing a tendon without using anchors is disclosed. In another embodiment, the present invention includes a method of surgically repairing a tendon using anchors. In yet another embodiment of the present invention, a method for surgically repairing an Achilles tendon is disclosed.

According to one embodiment of the present invention, a method for surgically repairing a tendon using anchors is disclosed. The method of surgically repairing a tendon including placing a tourniquet around an extremity of a person, the extremity of the person including a ruptured tendon. First, inflating the tourniquet, creating a first incision over a midline of a tear of the ruptured tendon, removing adhesion and scar tissue from the ruptured tendon, and engaging a proximal stump of the ruptured tendon with at least one clamp. Next, running a first plurality of sutures through the ruptured tendon, wherein the first plurality of sutures runs from a proximal side of the ruptured tendon to a distal side of the ruptured tendon, and wherein the first plurality of sutures runs from a top of the proximal stump to a bottom of the proximal stump. Then, applying tension on the first plurality of sutures to create tension on the ruptured tendon, followed by inserting a second plurality of sutures through the ruptured tendon, wherein the second plurality of sutures runs through a medial side and a lateral side of the proximal stump, wherein the second plurality of sutures is positioned to exit a mid-substance of the proximal stump. Afterward. running a third plurality of sutures in a non-locking manner across a distal stump of the ruptured tendon, wherein the third plurality of sutures is inserted on a distal side of the distal stump and exits on a proximal side of the distal stump, creating a second incision in a posterior compartment of the ruptured tendon. Then, plantarflexing a foot of the extremity, tying the third plurality of sutures sequentially from a first suture to a second suture, wherein the first suture is a suture of the third plurality of sutures that is furthest from the ruptured tendon, wherein the second suture is a suture of the third plurality of sutures that is closest to the ruptured tendon, running the second plurality of sutures from a tip of the distal stump to a rupture site of the ruptured tendon, wherein the second plurality of sutures is run in a medial direction and a lateral direction, and creating a third incision in a medial direction and a lateral direction at an insertion junction, wherein the insertion junction is where the ruptured tendon inserts into a calcaneus. Next, running a box suture from a proximal medial side of the ruptured tendon to a distal medial side of the ruptured tendon, wherein the box suture further runs to a distal lateral side of the ruptured tendon and to a proximal lateral side of the ruptured tendon, wherein the box suture further runs to the proximal medial side of the ruptured tendon, tying the box suture, irrigating the ruptured tendon, closing the first incision with a first incision suture, inserting a second incision suture to close a subcutaneous area around the ruptured tendon; and inserting staples into skin surrounding the tendon.

In another embodiment, the method of surgically repairing a tendon including repairing an Achilles tendon. The tendon repair method further includes a prone person. In another example, the tendon repair method includes a first incision made through a peritenon of the ruptured tendon. In one embodiment, the at least one clamp includes an Allis clamp. In yet another embodiment, the ruptured tendon repair includes a third plurality of sutures comprising polydioxanone. In one embodiment, the ruptured tendon repair includes a second plurality of sutures including a tape suture or a wide suture, wherein the tape suture or the wide suture is positioned on a proximal side of the second suture of the third plurality of sutures. In another example, the rupture tendon repair includes a first plurality of sutures, a second plurality of sutures, and/or a third plurality of sutures including a 6-core non-locking suture strand. In yet another embodiment, the rupture tendon repair includes tying of the second plurality of sutures creates a plurality of knots, wherein at least one knot of the plurality of knots is positioned around the tear of the ruptured tendon.

According to another embodiment of the present invention, a method for surgically repairing a tendon without using anchors is disclosed. The tendon repair method including placing a tourniquet around an extremity of a person, the extremity of the person including a ruptured tendon, inflating the tourniquet, creating a first incision over a midline of a tear of the ruptured tendon, removing adhesion and scar tissue from the ruptured tendon, engaging a proximal stump of the ruptured tendon with at least one clamp, running a first plurality of sutures through the ruptured tendon, wherein the first plurality of sutures runs from a proximal side of the ruptured tendon to a distal side of the ruptured tendon, wherein the first plurality of sutures run from a top of the proximal stump to a bottom of the proximal stump, applying tension on the first plurality of sutures to create tension on the ruptured tendon, inserting a second plurality of sutures through the tendon, wherein the second plurality of sutures runs through a medial side of the proximal stump and a lateral side of the proximal stump, wherein the second plurality of sutures are positioned to exit a mid-substance of the proximal stump, running a third plurality of sutures in a non-locking manner across a distal stump of the ruptured tendon, wherein the third plurality of sutures is inserted on a distal side of the distal stump and exits on a proximal side of the distal stump, creating a second incision in a posterior compartment of the ruptured tendon, plantarflexing a foot of the ruptured tendon, tying the third plurality of sutures sequentially from a first suture to a second suture, wherein the first suture is a suture of the third plurality of sutures that is furthest from the ruptured tendon, wherein the second suture is a suture of the third plurality of sutures that is closest to the ruptured tendon, running the second plurality of sutures in a lateral direction from a tip of the distal stump of the ruptured tendon to a rupture site of the ruptured tendon, creating a third incision in a medial direction and a lateral direction at an insertion junction, wherein the insertion junction is where the ruptured tendon inserts into a calcaneus, running the second plurality of sutures through the third incision, wherein the second plurality of sutures further runs through the ruptured tendon, wherein the second plurality of sutures exits through the first incision and runs back up the medial side of the ruptured tendon, wherein the second plurality of sutures are tied at the rupture site, running a box suture from a proximal medial side of the ruptured tendon to a distal medial side of the ruptured tendon, wherein the box suture further passes to a distal lateral side of the ruptured tendon and to a proximal lateral side of the ruptured tendon, wherein the box suture is passed to the proximal medial side of the ruptured tendon, tying the box suture, irrigating the ruptured tendon, closing the first incision with a first incision suture, closing subcutaneous tissue around the ruptured tendon with a subcutaneous suture, and inserting staples into skin surrounding the ruptured tendon.

In one embodiment, the method of tendon repair includes wherein about two-thirds of the first incision is positioned over the proximal stump of the ruptured tendon and about one-third of the first incision is positioned over the rupture site of the ruptured tendon. In another embodiment, the method of tendon repair includes a first incision suture that is an absorbable suture. In yet another embodiment of the method of tendon repair, the ruptured tendon is an Achilles tendon, wherein the foot of the extremity is placed into a splint after the insertion of the staples, wherein the foot is positioned into plantarflexion when inserted into the splint. In one embodiment of the tendon repair, the first incision is between about two centimeters and about three centimeters. In yet another embodiment, the first plurality of sutures, the second plurality of sutures, and the third plurality of sutures are nonabsorbable.

In yet another embodiment of the present invention, a method for surgically repairing an Achilles tendon is disclosed. The tendon repair method including placing a tourniquet around an extremity of a person, the extremity of the person including a ruptured Achilles tendon, inflating the tourniquet, creating a first incision over a midline of a tear of the ruptured Achilles tendon, removing adhesion and scar tissue from the ruptured Achilles tendon, engaging a proximal stump of the ruptured Achilles tendon with at least one clamp, running a first plurality of sutures through the ruptured Achilles tendon, wherein the first plurality of sutures runs from a proximal side of the ruptured Achilles tendon to a distal side of the ruptured Achilles tendon, wherein the first plurality of sutures run from a top of the proximal stump to a bottom of the proximal stump, applying tension on the first plurality of sutures to create tension on the ruptured Achilles tendon, inserting a second plurality of sutures through the ruptured Achilles tendon, wherein the second plurality of sutures runs through a medial side and a lateral side of the proximal stump, wherein the second plurality of sutures are positioned to exit a mid-substance of the proximal stump, running a third plurality of sutures in a non-locking manner across a distal stump of the ruptured Achilles tendon, wherein the third plurality of sutures is inserted on a distal side of the distal stump and exits on a proximal side of the distal stump, creating a second incision in a posterior compartment of the ruptured Achilles tendon, plantarflexing a foot of the extremity, tying the third plurality of sutures sequentially from a first suture to a second suture to create a plurality of knots, wherein the first suture is a suture of the third plurality of sutures that is furthest from the ruptured Achilles tendon, wherein the second suture is a suture of the third plurality of sutures that is closest to the ruptured Achilles tendon, wherein at least one knot of the plurality of knots is positioned near a rupture site, running the second plurality of sutures from a tip of the distal stump to the rupture site in a medial direction and a lateral direction, creating a third incision in a medial direction and a lateral direction at an insertion junction, wherein the insertion junction is where the ruptured Achilles tendon inserts into a calcaneus, inserting an anchor at the calcaneus, wherein the anchor is positioned through each of the first incision, the second incision, and the third incision, running a box suture from a proximal medial side of the ruptured Achilles tendon to a distal medial side of the ruptured Achilles tendon, wherein the box suture further runs to a distal lateral side of the ruptured Achilles tendon and to a proximal lateral side of the ruptured Achilles tendon, wherein the box suture is further passed to the proximal medial side of the ruptured Achilles tendon, tying the box suture, irrigating the ruptured Achilles tendon, closing the first incision with a first incision suture, closing subcutaneous tissue around the ruptured Achilles tendon with a subcutaneous suture, and inserting staples into skin surrounding the ruptured Achilles tendon.

In one embodiment, the tendon repair method includes a first plurality of knots including at least six knots. In another embodiment, typing the box suture creates a second plurality of knots. In yet another embodiment of the tendon repair method, at least one of the first plurality of sutures, the second plurality of sutures, or the third plurality of sutures includes nonabsorbable sutures. In one embodiment, the tendon repair method includes about two-thirds of a first incision positioned over the proximal stump of the ruptured Achilles tendon and about one-third of the first incision positioned over the rupture site of the ruptured Achilles tendon.

The Achilles tendon connects the gastrocnemius and soleus muscles (calf muscles) to the calcaneus (heel bone) and forms the largest and strongest tendon in the human body. The Achilles tendon is formed by the fusion of the tendons of the two bellies of the gastrocnemius, which lie superficially, and the soleus muscle, which lies deeper than the gastrocnemius. The Achilles tendon inserts into the posterior part of the calcaneus and attaches to the plantar fascia. The link between the Achilles tendon, the calf muscles, and the heel affects the ability of an individual to walk, run, and jump. Therefore, the health of the Achilles tendon is important to the mobility of a person, especially professional athletes.

Achilles tendon ruptures account for 20% of all tendon injuries. These injuries most commonly occur during sporting activities in men over the age of 40. In the United States, basketball is the most common sport associated with Achilles tendon ruptures in the United States (48%), followed by tennis (15%), and football (12%). Additionally, these injuries require a significant recovery time with an average of between four months and twelve months. There are more extreme cases, for example, National Basketball Association (NBA) player Kevin Durant needed approximately 18 months of recovery to resume playing in the NBA.

Additionally, there has been a tenfold increase in the incidence of Achilles tendon ruptures because of increased athletic participation from 2.1 per 100,000 person-years in 1979 to 21.5 per 100,000 person-years in 2011. The Achilles tendon has a hypovascular region located 2 to 6 centimeters proximal to its insertion onto the calcaneus. Risk factors for rupture of the Achilles tendon include hypertension, diabetes mellitus, fluroquinolone use, corticosteroid use, end-stage renal disease, and obesity.

Historically, nonoperative treatment of Achilles tendon ruptures included non-weight bearing in a short leg casting for 6-8 weeks, which lead to a re-rupture rate up to 13%. With the advent of functional rehabilitation, nonoperative treatment has been shown to have similar re-rupture rates and lower wound complications compared to open approaches.

Even though there has been success with instrument-guided mini-open Achilles percutaneous Achilles tendon repair, there is still a problem with damaging the sural nerve because there is a blind passage of suture needles percutaneously into the Achilles tendon. Another problem that occurs with instrument-guided approaches is missing the tendon with the sutures because the instrument guide forces a physician to follow a certain path through the tendon.

Therefore, there is a need for a method of surgically repairing a torn or ruptured Achilles tendon that lowers the risk of nerve damage and improves recovery.

Figure 1B:
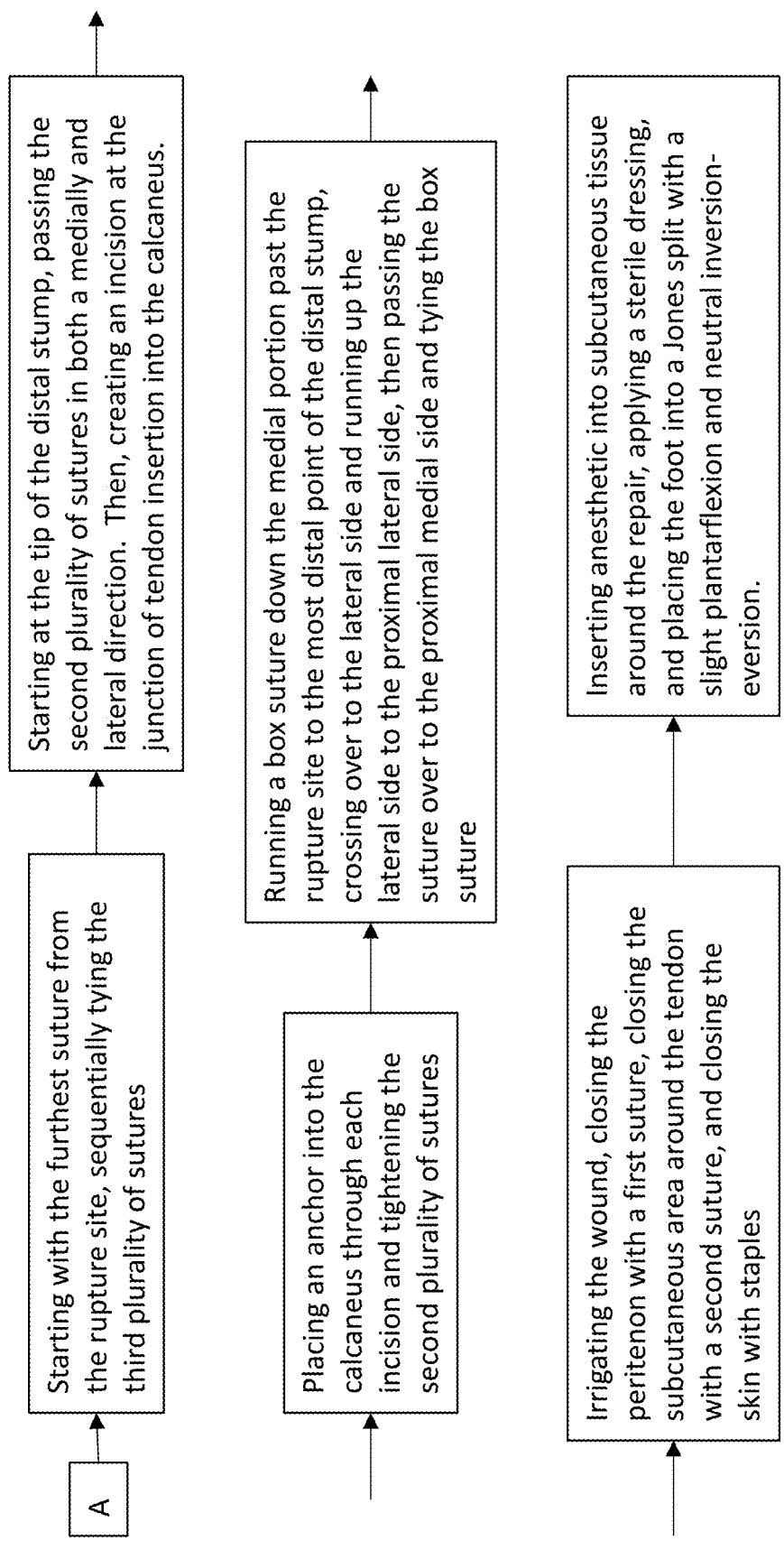
FIG. 1B illustrates a flow diagram of a surgical repair of an Achilles tendon according to one embodiment of the present invention.
Figure 2B:
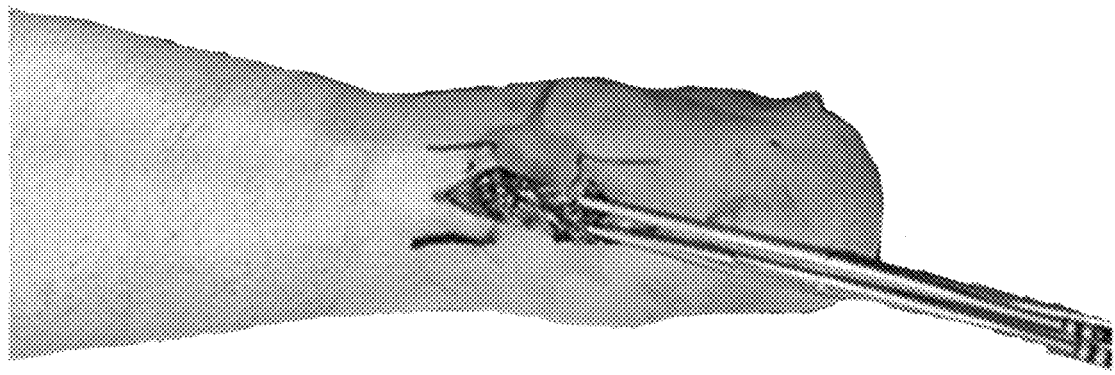
FIG. 2B illustrates a posterior view of a foot after an incision for a surgical repair of an Achilles tendon according to one embodiment of the present invention.
Figure 2A:
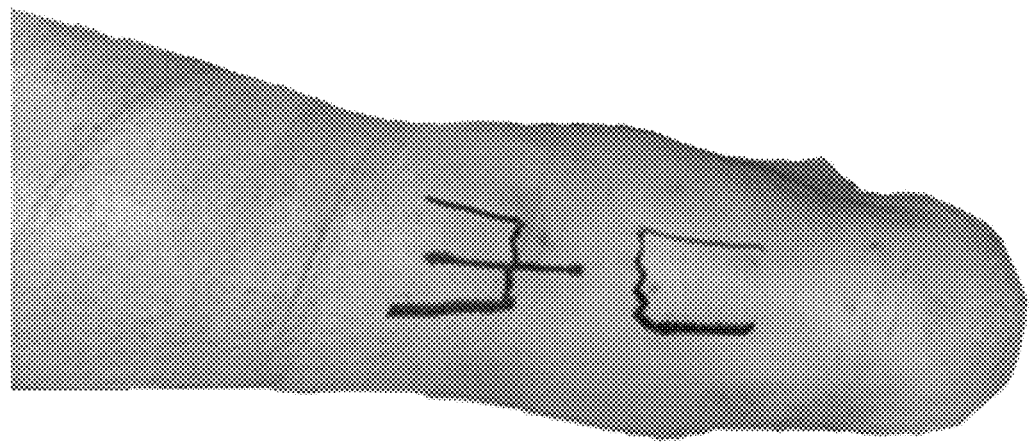
FIG. 2A illustrates a posterior view of a foot prior to an incision for a surgical repair of an Achilles tendon according to one embodiment of the present invention.

In one embodiment, as shown in FIGS. 1A and 1B, the present invention includes a method of surgically repairing a ruptured tendon. In one embodiment, the ruptured tendon includes an Achilles tendon. Alternatively, in another embodiment, the ruptured tendon includes a patellar tendon or a quadriceps tendon. First, a tourniquet is placed around a leg of a prone patient including the ruptured tendon, and the tourniquet is inflated. Alternatively, an Esmarch bandage is placed around the leg. In another embodiment, the patient is in a supine position. As shown in FIG. 2A, an incision is made over the midline of the tear in the tendon. In one embodiment, about two-thirds of the incision is positioned over the proximal stump of the tendon and approximately one-third of the incision is positioned over the gap of the rupture site of the tendon. Additionally, the incision is made through the peritendinous area. Any adhesion, hematomas, or scar tissue is removed from the tendon to improve the range of motion and healing process of the tendon. Next, as shown in FIG. 2B, the proximal stump of the tendon is grasped with a clamp. Alternatively, the proximal stump of the tendon is grasped with at least two clamps. For example, and not limitation, the at least two clamps include Allis clamps.

Figure 3:
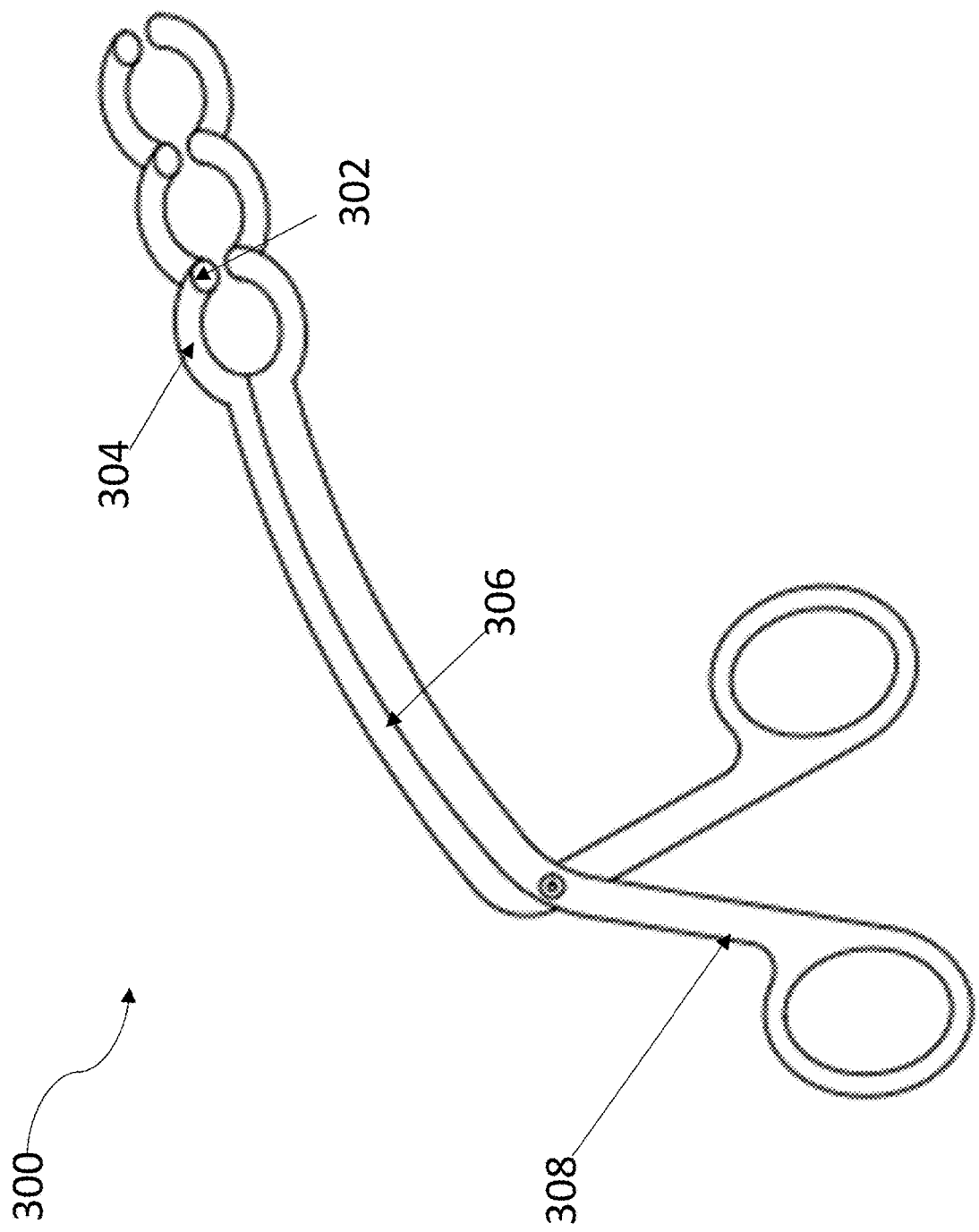
FIG. 3 illustrates a side view of a clamp according to one embodiment of the present invention.

In yet another embodiment, the at least two clamps include Kocher forceps. In another embodiment, as shown in FIG. 3, the clamp 300 includes at least one toe attachment component 302, at least two blades 304, a shank corresponding to each blade 306, and a handle 308. The at least one toe attachment component is configured to attach to tissue, muscles, and other similar parts of a body. For example, and not limitation, the toe attachment component includes a soft pad. The soft pad includes a surface pattern to improve the grip of the clamp. In one embodiment, the blades include a curved shape. In another embodiment, the blades are designed for sutures to pass between the two blades. In yet another embodiment, each blade includes a plurality of curves. Each curve of the plurality of curves includes a toe attachment component. Advantageously, each toe attachment component is operable to grasp tissue, muscle, or other parts of the body. In one embodiment, the plurality of curves includes at least two curves. In another embodiment, the clamp includes an extendable component that enables the blades and toe attachment component to extend from the shank. In yet another embodiment, the clamp includes at least two toe attachment components. In another embodiment, the clamp includes at least three toe attachment components.

After at least one clamp attaches to the proximal stump of the tendon, a first plurality of sutures is horizontally run through the tendon. The first plurality of sutures starts on the proximal side of the tendon and passes through the tendon to the distal side of the tendon. The first plurality of sutures further runs from the top of the proximal stump to the rupture site. After the first plurality of sutures reaches the rupture site, the first plurality of sutures is tightened to create tension on the tendon.

After the first plurality of sutures is tightened, a second plurality of sutures is run through the tendon. In one embodiment, the second plurality of sutures includes a tape suture or a wide-based suture. The second plurality of sutures is positioned on the proximal side of the closest proximal suture of the first plurality of sutures. The second plurality of sutures runs through the medial and lateral sides of the proximal stump of the tendon and exits through the mid-substance of the proximal stump.

Figure 4B:
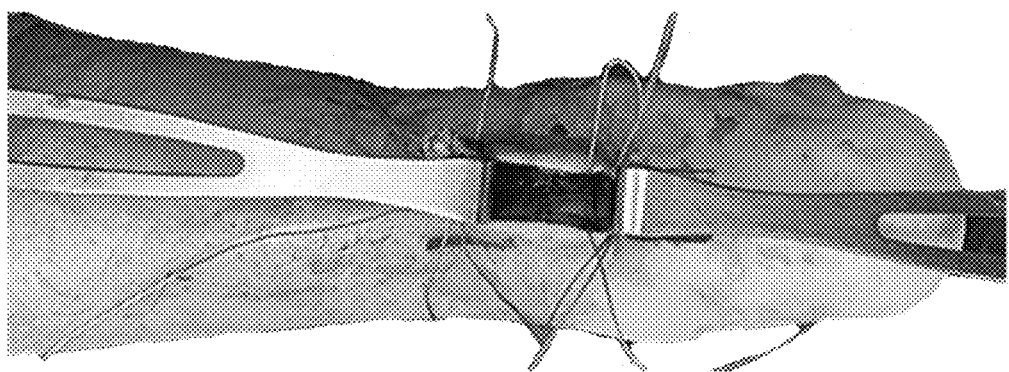
FIG. 4B illustrates a posterior view of a foot during a surgical repair of an Achilles tendon according to one embodiment of the present invention.
Figure 4A:
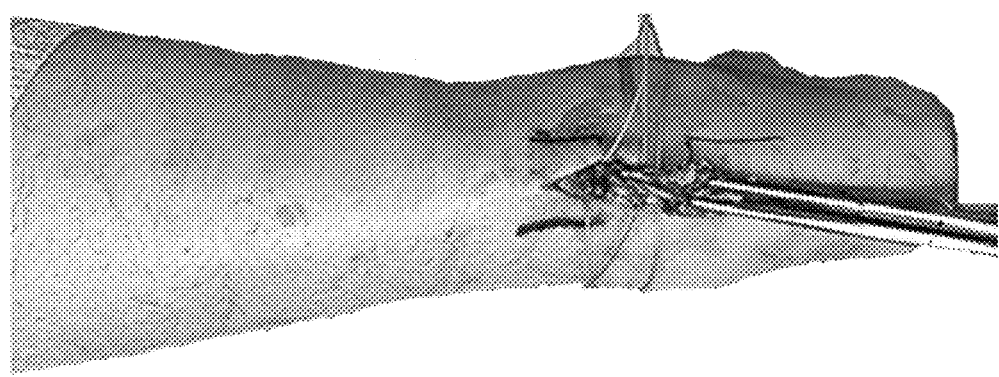
FIG. 4A illustrates suturing of a foot during a surgical repair of an Achilles tendon according to one embodiment of the present invention.

As shown in FIG. 4A, after the second plurality of sutures has been run through the proximal stump, a third plurality of sutures is horizontally passed through the distal stump of the tendon. The third plurality of sutures is passed from the distal side to the proximal side of the distal stump while moving from the tip of the distal stump to the rupture site. Next, as shown in FIG. 4B, the proximal stump and the distal stump are reflected to provide access to the posterior compartment of the tendon. An incision is created in the posterior compartment and the foot is passively put into plantarflexion. Advantageously, this enables the flexor hallucis longus muscle to rest against the tendon and increases blood supply to the tendon.

In yet another embodiment, an autograft, allograft, or synthetic graft is positioned on the posterior compartment of the repair prior to tying the proximal and distal stumps together.

Figure 5A:
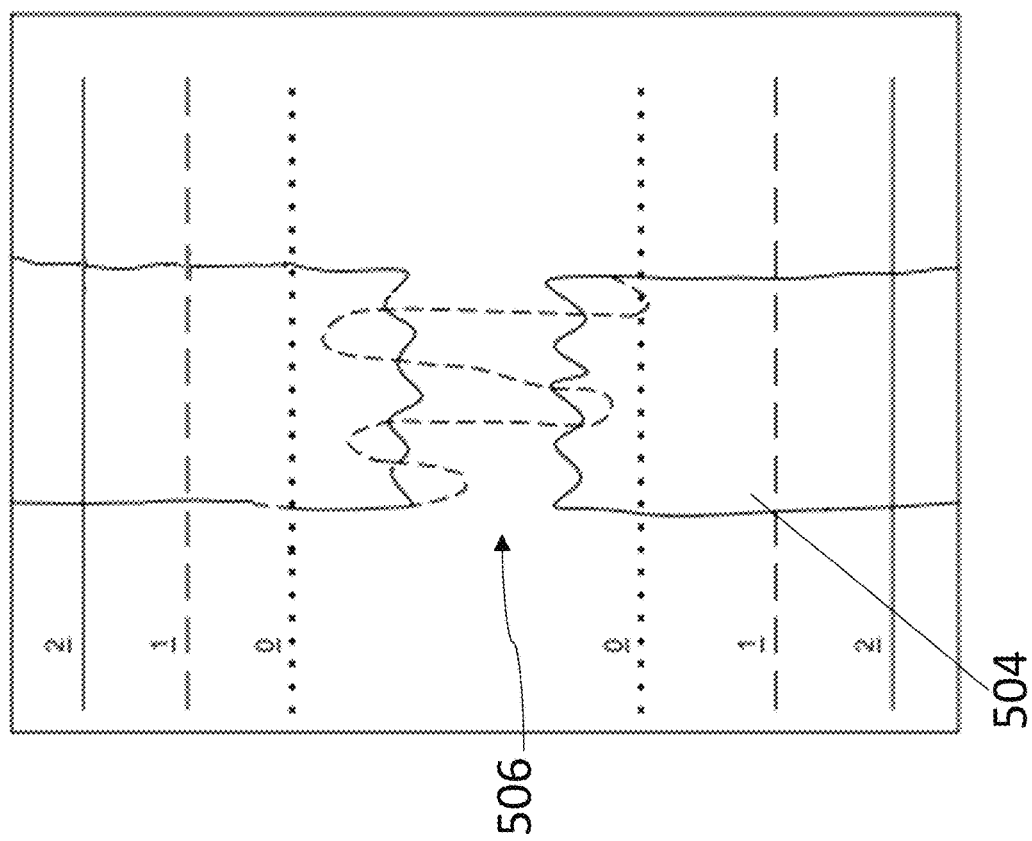
FIG. 5A illustrates a diagram of sequentially tying of sutures during a surgical repair of an Achilles tendon according to one embodiment of the present invention.
Figure 5B:
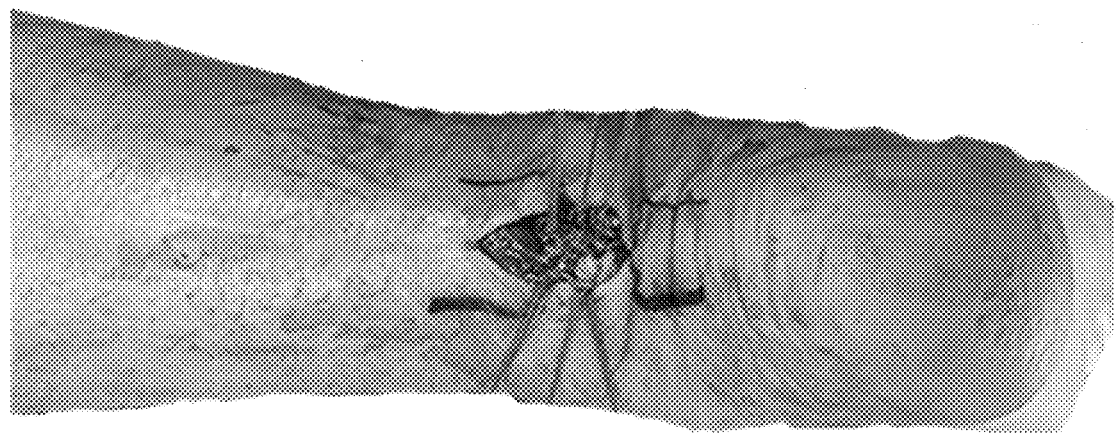
FIG. 5B illustrates a posterior view of the sequentially tying of sutures during a surgical repair of an Achilles tendon according to one embodiment of the present invention.

After the foot is put into plantarflexion, the third plurality of sutures is sequentially tied as shown in FIGS. 5A and 5B. The furthest suture from the rupture site is tied first and the nearest suture to the rupture site is tied last. In one embodiment, the sutures are tied to create at least one knot. In yet another embodiment, the sutures are tied to create between about 5 knots to about 7 knots. In a preferred embodiment, at least one knot is positioned around the rupture site. In another embodiment, the knots are incorporated into the repair. Advantageously, this enables scar tissue to engulf the knots and decreases the chance of soft tissue irritation from the plurality of knots.

Figure 6:
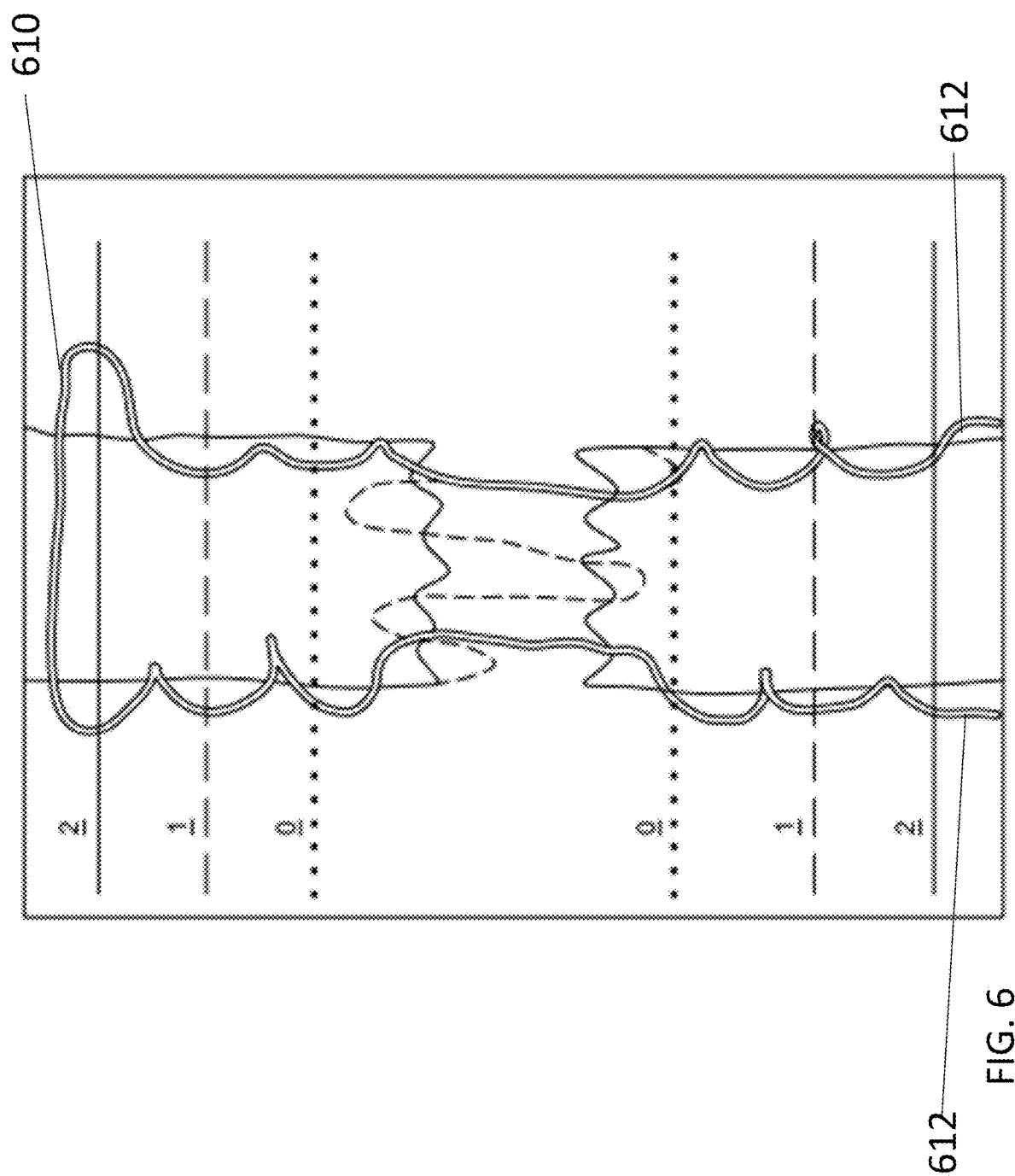
FIG. 6 illustrates a diagram of a surgical repair of an Achilles tendon using anchors according to one embodiment of the present invention.
Figure 7:
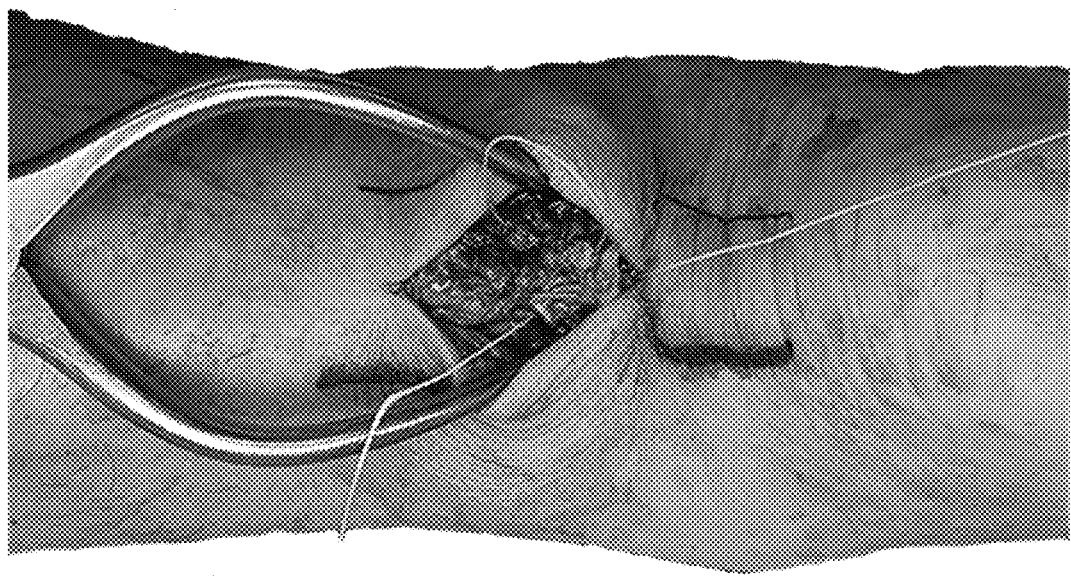
FIG. 7 illustrates a posterior view of a foot during a surgical repair of an Achilles tendon according to one embodiment of the present invention.
Figure 8:
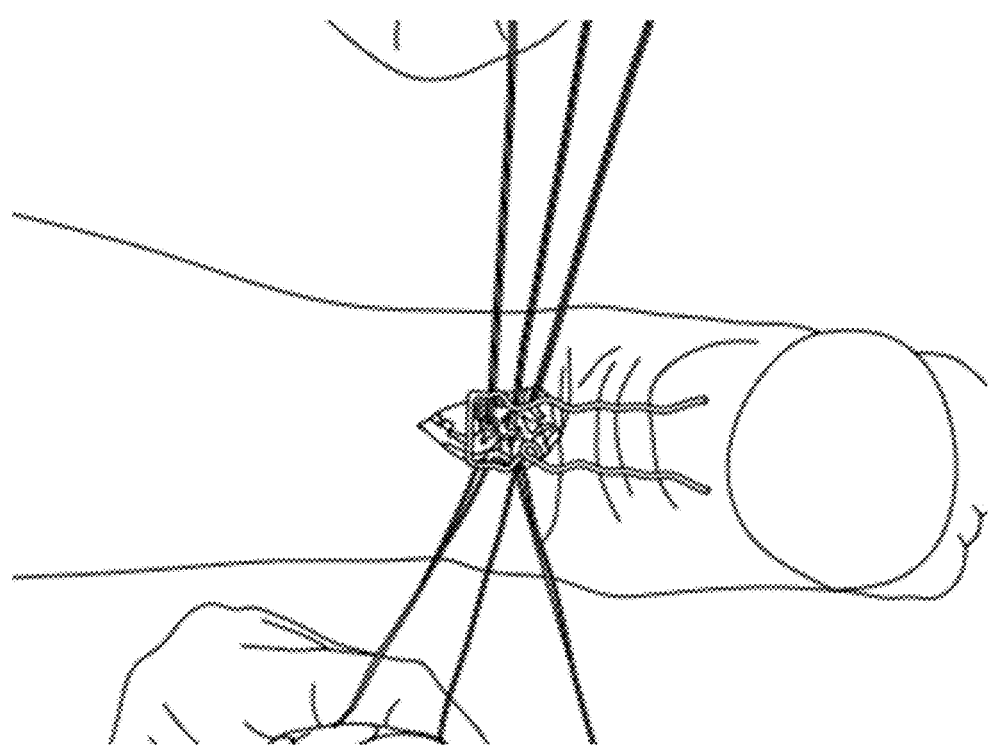
FIG. 8 illustrates a diagram of a box suture during a surgical repair of an Achilles tendon according to one embodiment of the present invention.

The second plurality of sutures is then further run from the tip of the distal stump 504 of the tendon to the rupture site 506. In a preferred embodiment, the second plurality of sutures 610 is run in both the medial and lateral directions. Next, an incision is made medially and laterally at the junction of the tendon insertion into the calcaneus. Afterward, as shown in FIGS. 6 and 7, anchors 612 are inserted at the calcaneus and run through each incision. For example, and not limitation, the anchors include metallic suture anchors (e.g., titanium or stainless steel), biodegradable suture anchors (e.g., poly-L-lactic acid (PLLA), biostable suture anchors (e.g., polyetheretherketone (PEEK) polymer), biocomposite suture anchors (e.g., poly-lactic co-glycolide (PLGA), beta-tricalcium phosphate (β-TCP), and calcium sulfate), and/or all-soft suture anchors (e.g., ultra-high-molecular-weight polyethylene (UHMWPE)). In yet another example, the anchors are between about 4.5 mm to about 15 mm, absorbable or nonabsorbable, and/or knotted or knotless. The anchors tighten the incisions and pluralities of sutures as well as the connection between the tendon and the calcaneus. Advantageously, the anchors increase the biomechanical strength of the tendon and improve the healing of the tendon. Furthermore, the anchors allow the proximal stump to hold tension, which results in less tension at the repair site and minimizes the stretching of the repair. After the anchors are inserted, as shown in FIG. 8, a box suture is run from the proximal medial side of the tendon to the distal medial side, then from the distal lateral side to the proximal lateral side, and then back to the proximal medial side. For example, and not limitation, the box suture runs, in a nonlocking fashion, down the medial portion of the tendon, past the rupture site to the most distal point of the distal stump, crosses over to the lateral side and runs up the lateral side all the way to the proximal lateral side, then the suture is thrown over to the proximal medial side and tied. Advantageously, this increases the number of differently oriented sutures passing across the rupture site.

The tendon is then irrigated before the incision made in the peritenon is closed. In one embodiment, the peritenon incision is closed with an absorbable suture. For example, and not limitation, the absorbable suture includes a 2-0 VICRYL® suture. The absorbable suture is run in a non-locking fashion (medially or laterally) on the dorsal side of the tendon and under the surface of the Achilles repair. Lastly, a subcutaneous suture is used to close the subcutaneous tissue, and staples are inserted to close the skin. In one embodiment, the subcutaneous suture includes an absorbable suture. In another embodiment, the peritenon is not closed with an absorbable suture and only a subcutaneous suture is used. In yet another embodiment, the wound is closed with a zip-tie or wound glue. The foot is placed in a splint with a slight plantarflexion and neutral inversion-eversion. For example, and not limitation, the splint includes a Jones splint.

Figure 9A:
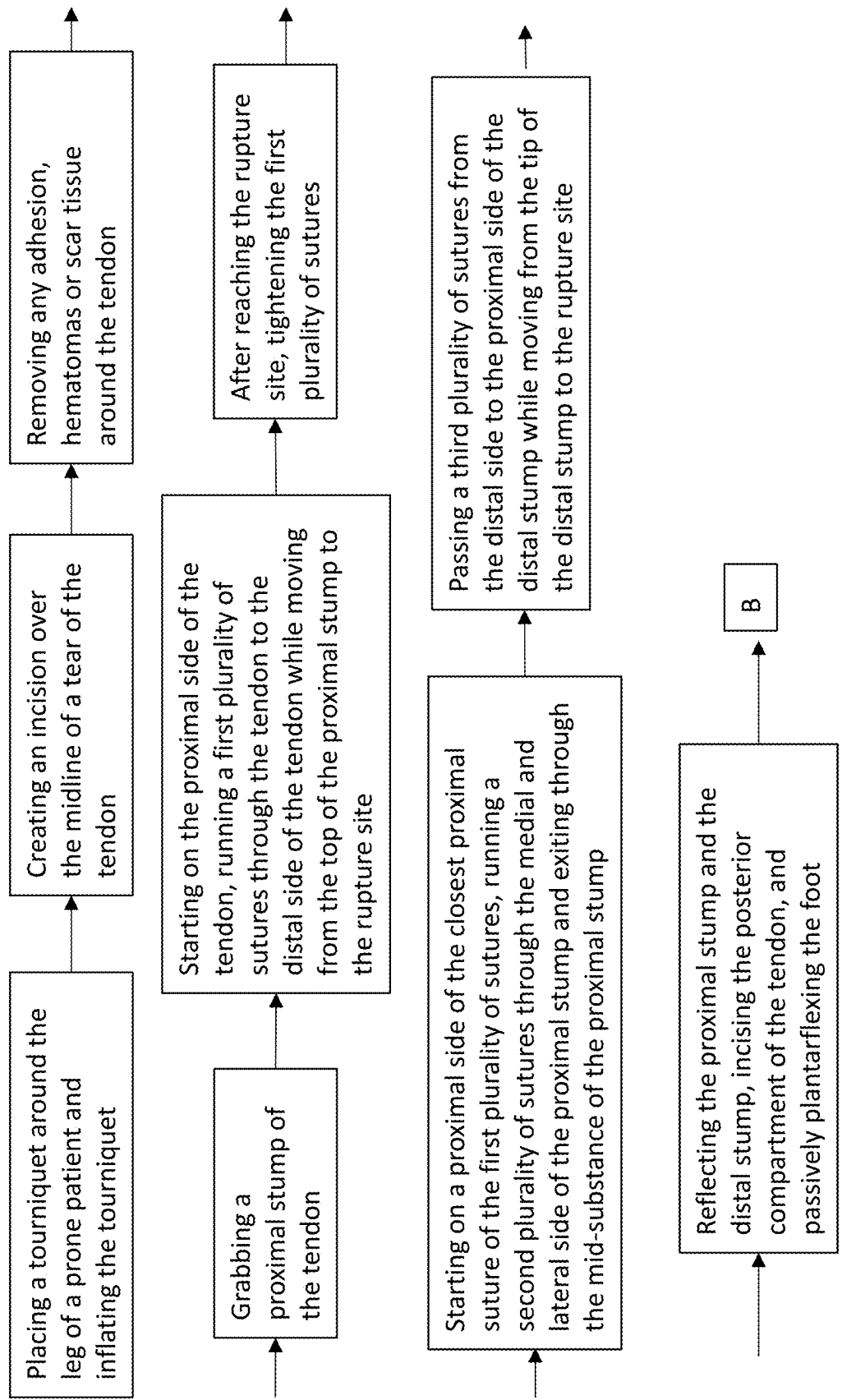
FIG. 9A illustrates a flow diagram of a surgical repair of an Achilles tendon according to one embodiment of the present invention.
Figure 9B:
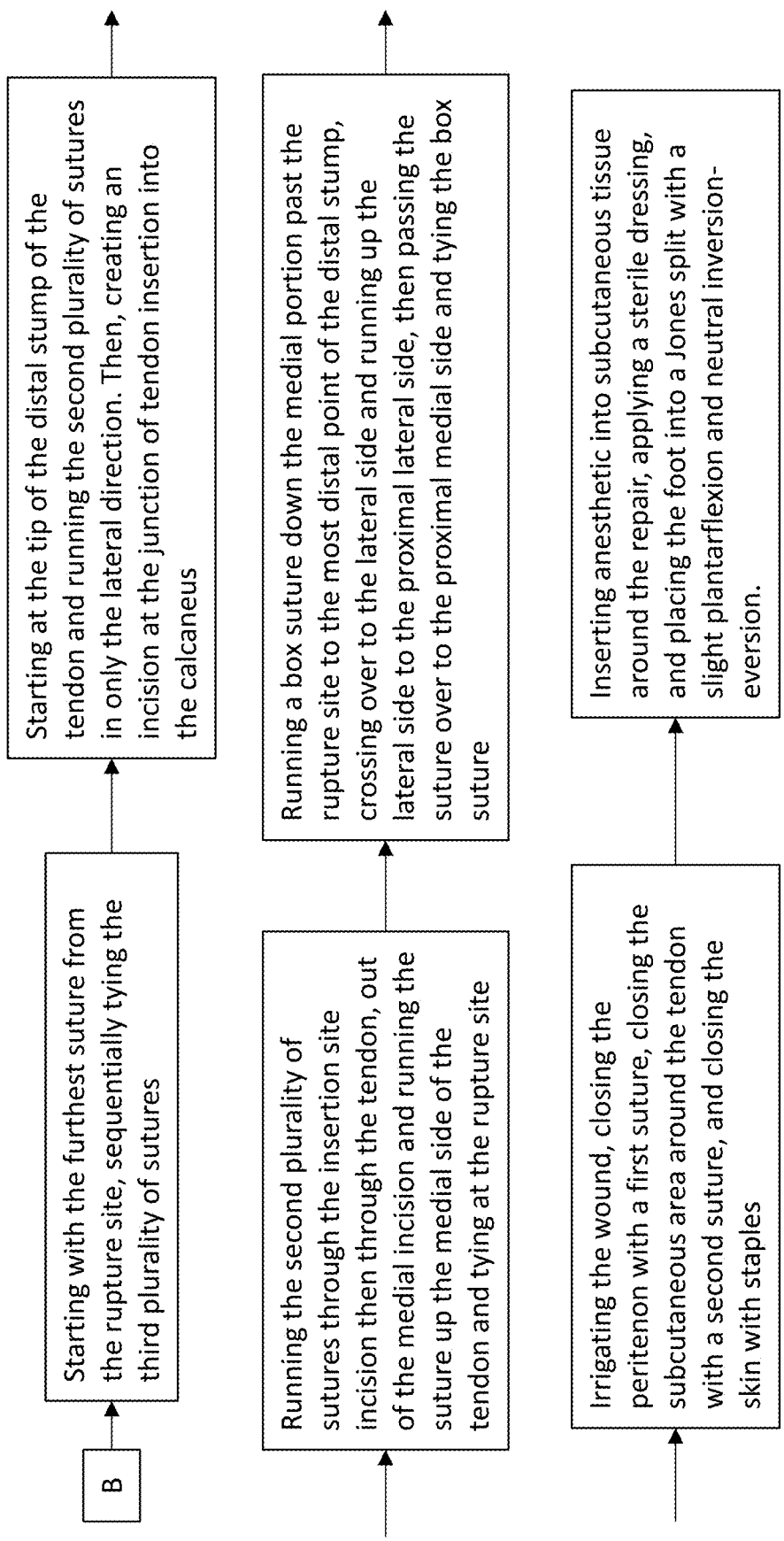
FIG. 9B illustrates a flow diagram of a surgical repair of an Achilles tendon according to one embodiment of the present invention.

In another embodiment, as shown in FIGS. 9A and 9B, the present invention includes a method of repairing a tendon without an anchor. First, a tourniquet is placed around a leg of a prone patient including the ruptured tendon, and the tourniquet is inflated. Alternatively, an Esmarch bandage is placed around the leg. An incision is made over the midline of the tear in the tendon. In one embodiment, about two-thirds of the incision is positioned over the proximal stump of the tendon and approximately one-third of the incision is positioned over the gap of the rupture site of the tendon. Additionally, the incision is made through the peritendinous area of the tendon. Any adhesion, hematomas, or scar tissue is removed from the tendon to improve the range of motion and the healing process of the tendon. Next, the proximal stump of the tendon is grasped with a clamp. Alternatively, the proximal stump of the tendon is grasped with at least two clamps. For example, and not limitation, the at least two clamps include Allis clamps. In yet another embodiment, the at least two clamps include Kocher forceps. After at least one clamp is attached to the proximal stump of the tendon, a first plurality of sutures is horizontally run through the tendon. The first plurality of sutures starts on the proximal side of the tendon and passes through the tendon to the distal side of the tendon. The first plurality of sutures further runs from the top of the proximal stump to the rupture site. After the first plurality of sutures reaches the rupture site, the first plurality of sutures is tightened to create tension on the tendon. For example, and not limitation, the first plurality of sutures includes absorbable sutures or nonabsorbable sutures. In a preferred embodiment, the first plurality includes non-locking sutures.

After the first plurality of sutures is tightened, a second plurality of sutures is run through the tendon. In one embodiment, the second plurality of sutures includes a tape or wide-based suture. The second plurality of sutures is positioned on the proximal side of the closest proximal suture of the first plurality of sutures. The second plurality of sutures runs through the medial and lateral sides of the proximal stump of the Achilles tendon and exits the midsubstance of the proximal stump.

After the second plurality of sutures has been run through the proximal stump, a third plurality of sutures is horizontally passed through the distal stump of the tendon. The third plurality of sutures is inserted on the distal side of the distal stump and exits on the proximal side of the distal stump. Next, the proximal stump and the distal stump are reflected to provide access to the posterior compartment. Then, a second incision is created in the posterior compartment and the foot is passively put into plantarflexion. The second incision allows the flexor hallucis longus muscle belly to rest against the repair site.

In yet another embodiment, an autograft, an allograft, or a synthetic graft is positioned on the posterior compartment of the repair prior to tying the proximal and distal stumps together.

After the foot is put into plantarflexion, the distance between stumps has decreased and the third plurality of sutures is sequentially tied. The furthest suture from the rupture site is tied first and the nearest suture to the rupture site is tied last. The third plurality of sutures is tied such that at least one knot is created. In one embodiment, the third plurality of sutures is tied to create a plurality of knots. The plurality of knots includes at least one knot positioned around the rupture site.

Figure 10:
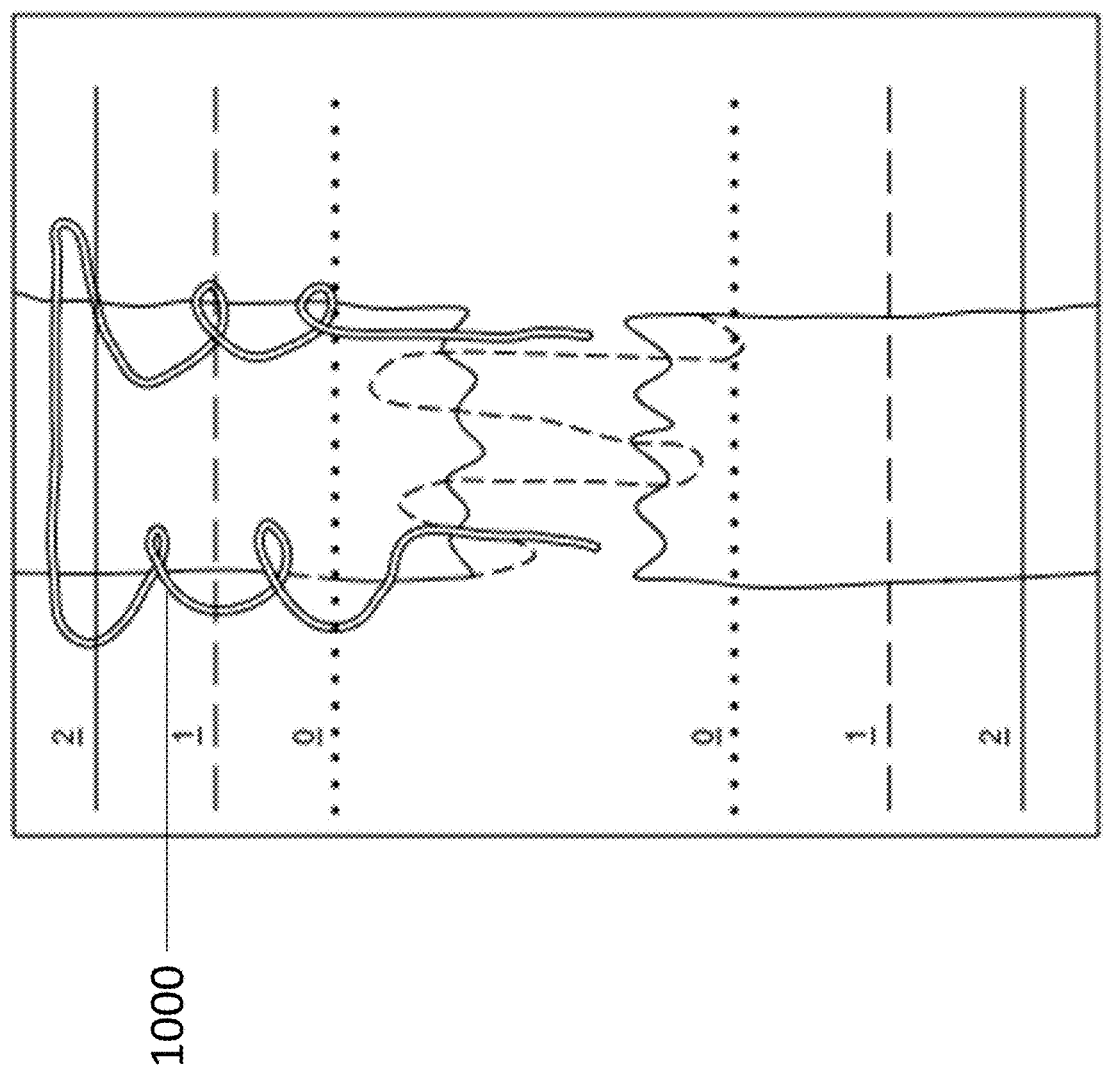
FIG. 10 illustrates a diagram for performing a surgical repair of an Achilles tendon without using anchors according to one embodiment of the present invention.
Figure 11:
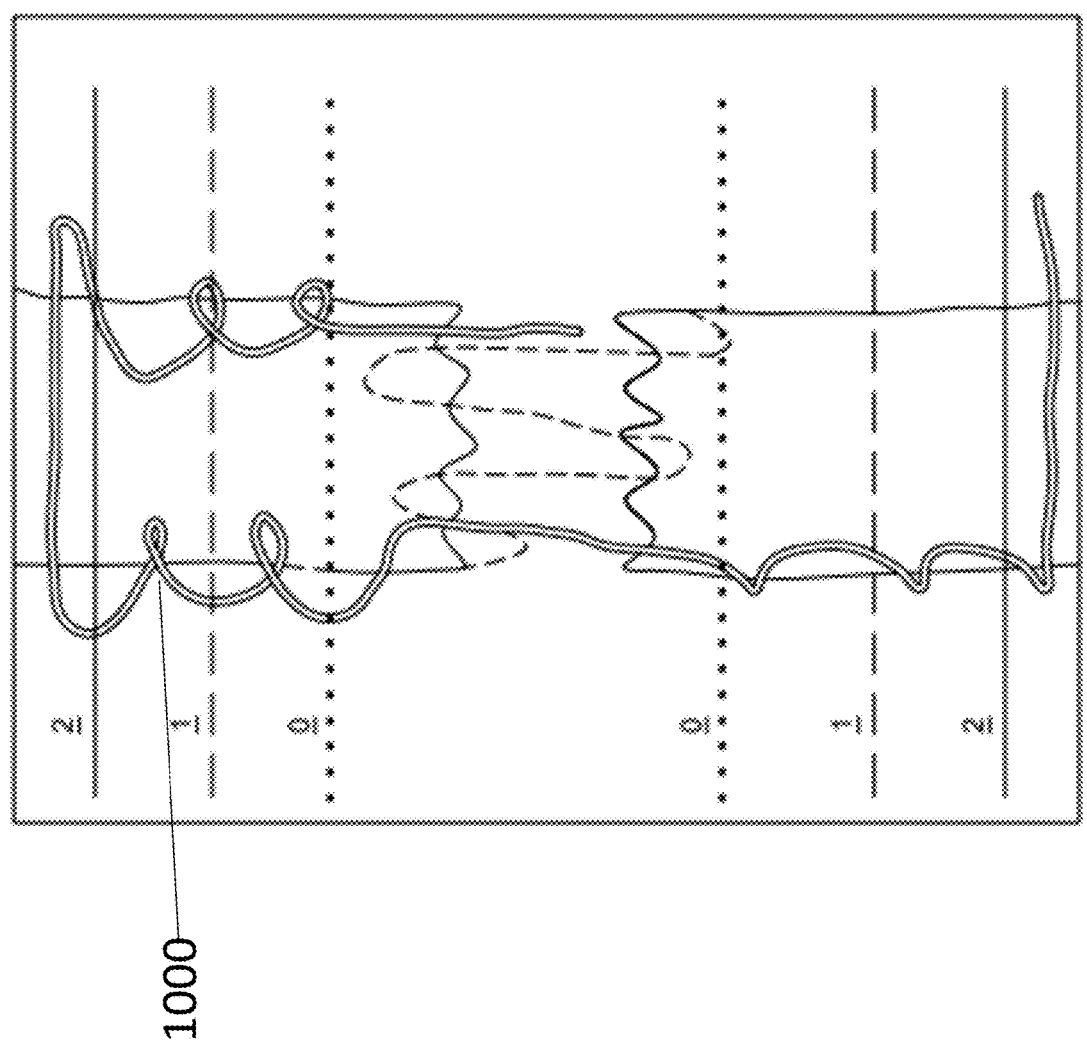
FIG. 11 illustrates a diagram for performing a surgical repair of an Achilles tendon without using anchors according to one embodiment of the present invention.
Figure 12:
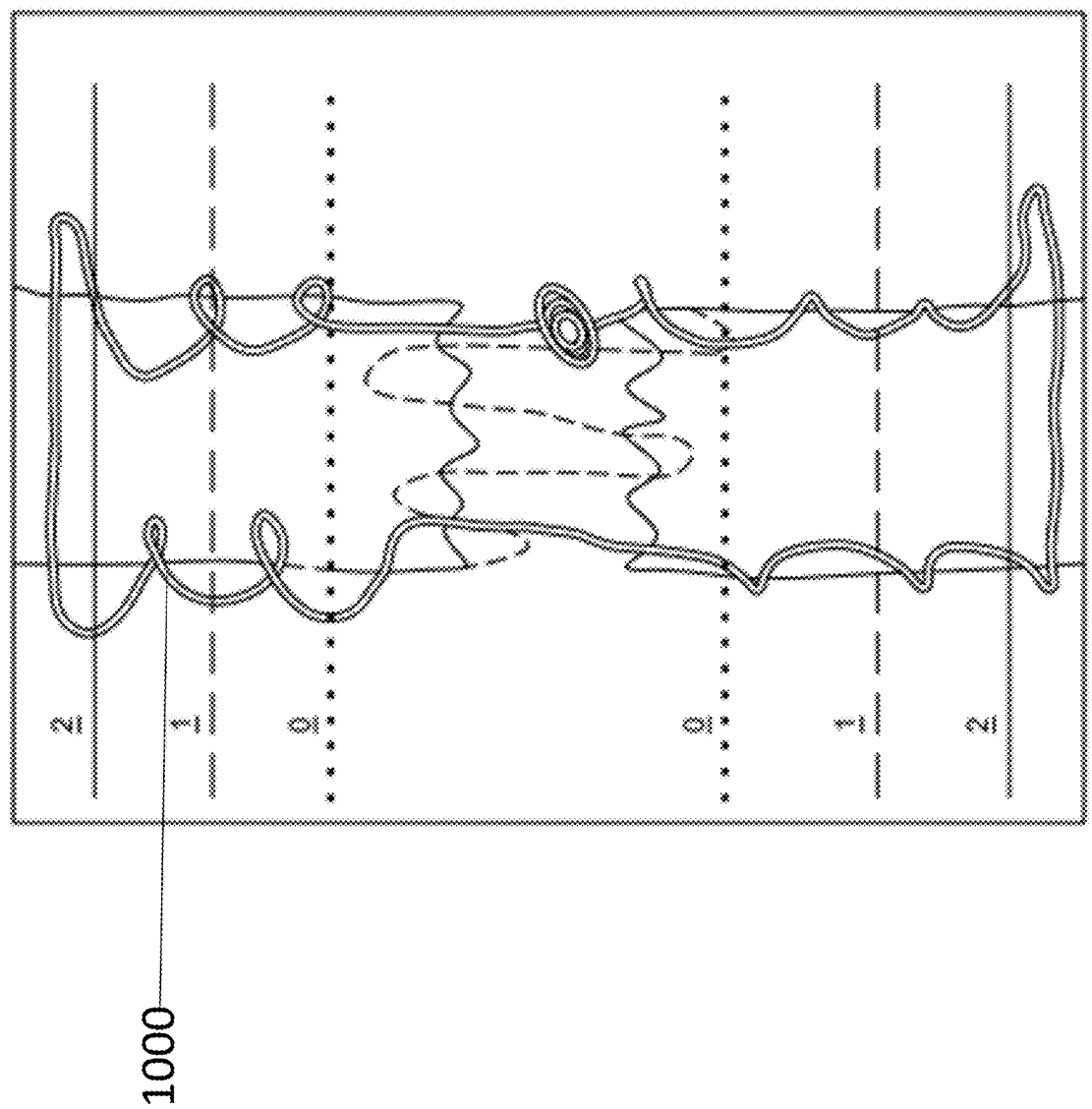
FIG. 12 illustrates a diagram for performing a surgical repair of an Achilles tendon without using anchors according to one embodiment of the present invention.
Figure 13:
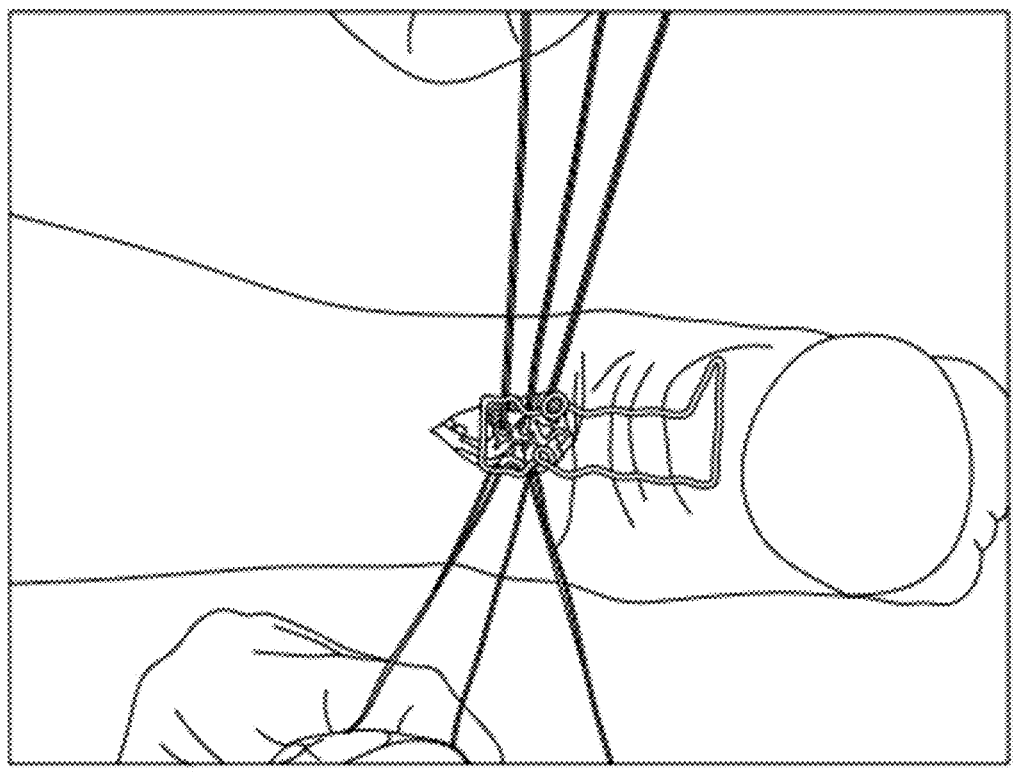
FIG. 13 illustrates a posterior view of a surgical repair of an Achilles tendon according to one embodiment of the present invention.
Figure 14:
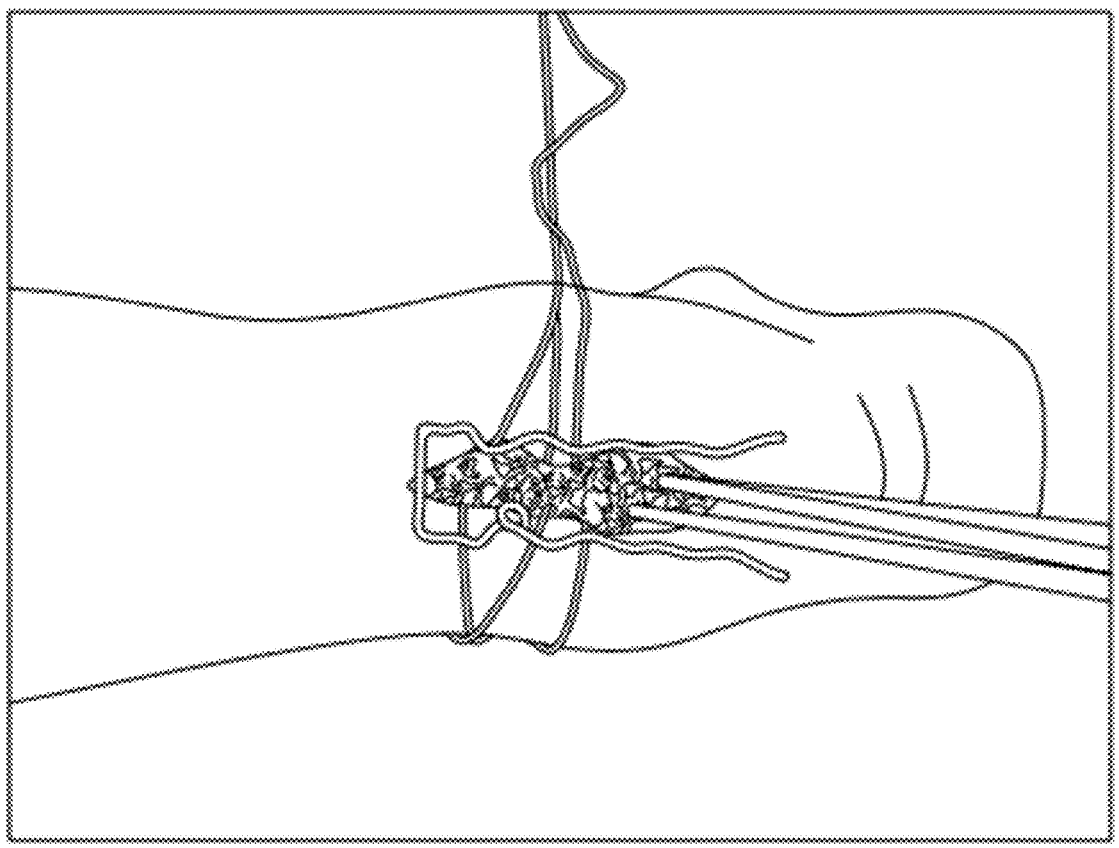
FIG. 14 illustrates a posterior view of a surgical repair of an Achilles tendon according to one embodiment of the present invention.
Figure 15A:
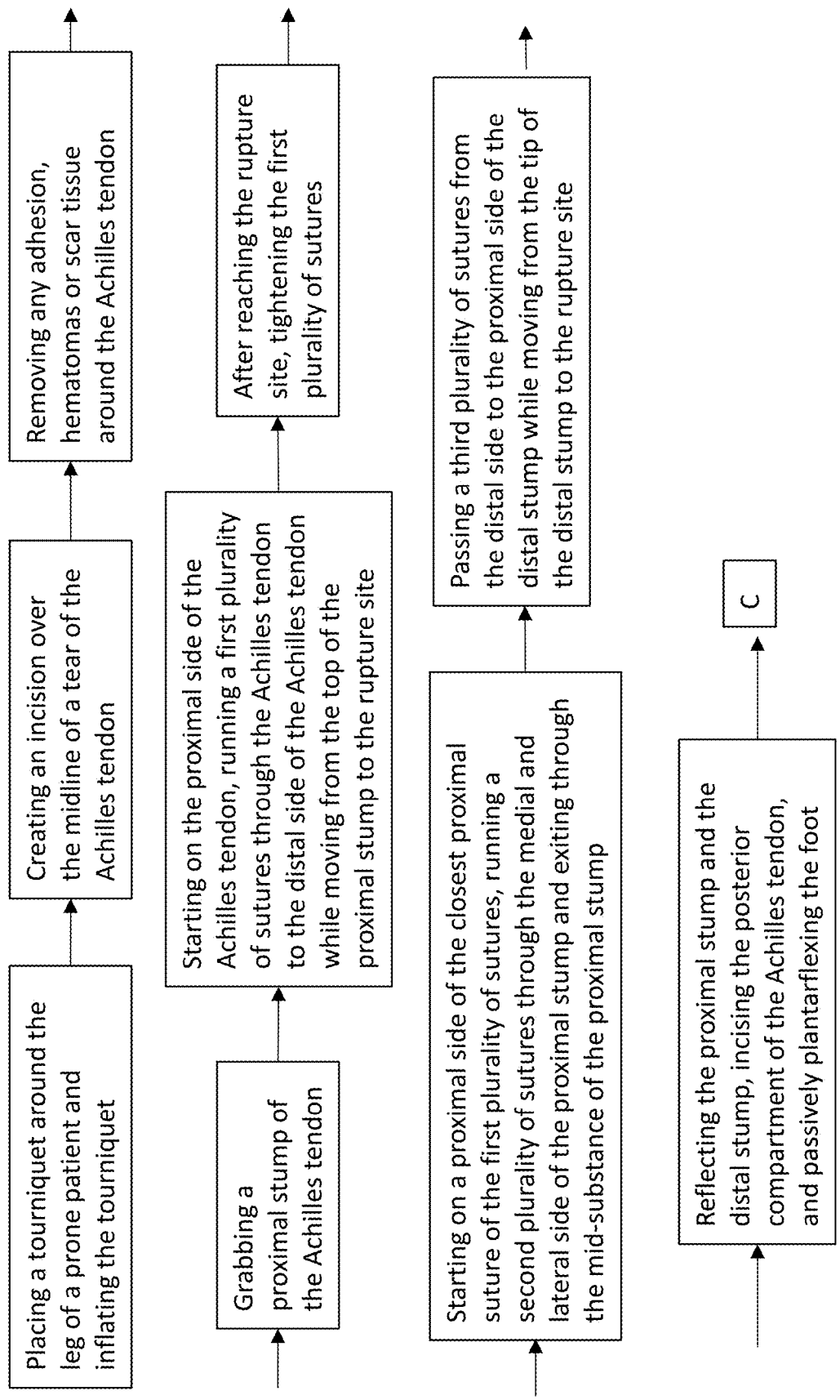
FIG. 15A illustrates a flow diagram of a surgical repair of an Achilles tendon according to one embodiment of the present invention.
Figure 15B:
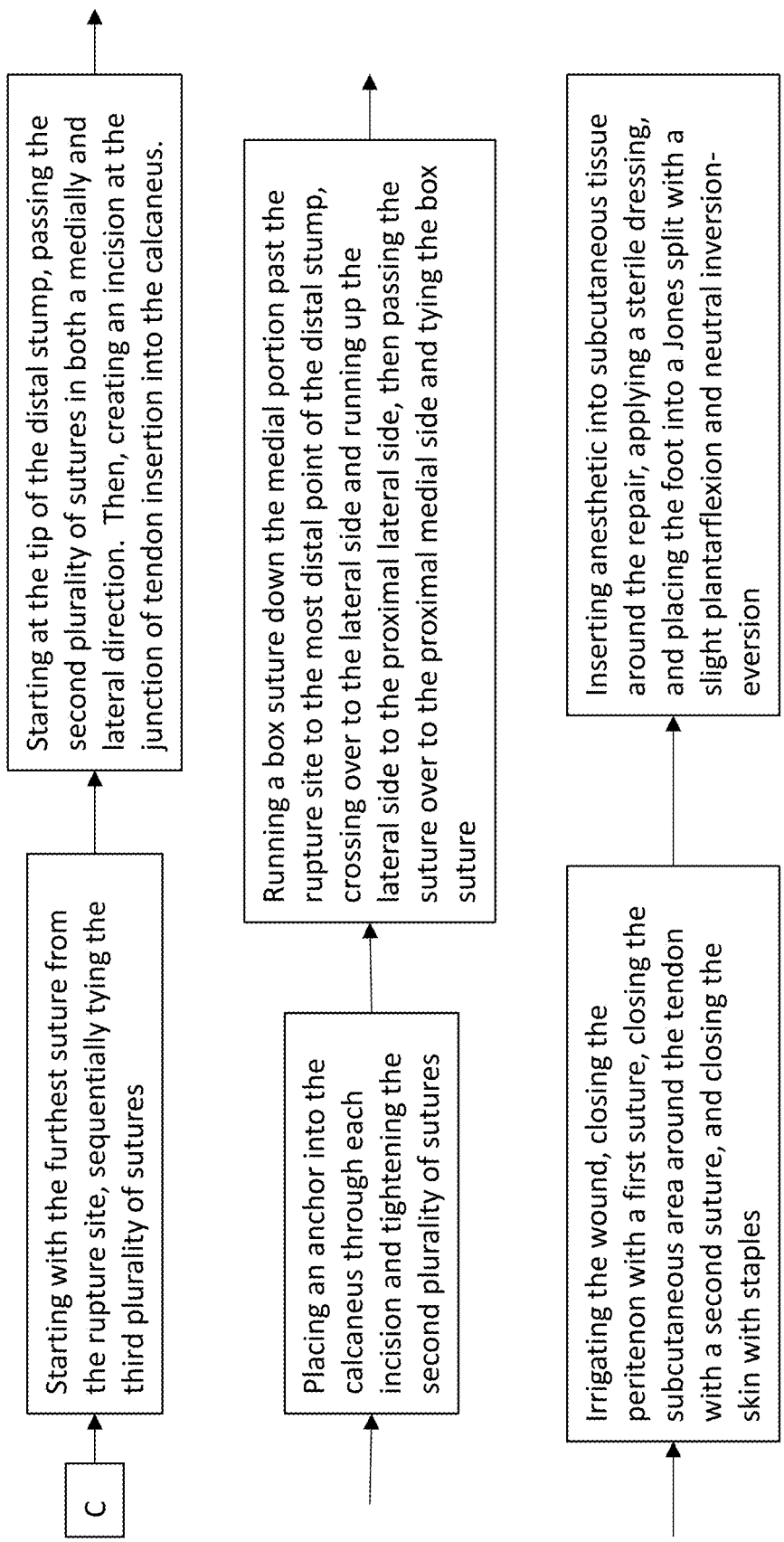
FIG. 15B illustrates a flow diagram of a surgical repair of an Achilles tendon according to one embodiment of the present invention.

Starting at the tip of the distal stump of the tendon, the second plurality of sutures 1000 is run as fast as possible in the lateral direction only, as shown in FIGS. 10 and 11. Then, an incision is made medially and laterally at the junction of the tendon insertion into the calcaneus. The second plurality of sutures is passed through the lateral incision, then through the tendon, and out of the medial incision. Next, the second plurality of sutures is run up the medial side of the tendon and tied at the rupture site. As shown in FIG. 12, the second plurality of sutures is tied to create at least one knot at the rupture site. FIG. 13 illustrates a posterior view of a surgical repair of an Achilles tendon according to another embodiment of the present invention. FIG. 14 illustrates a posterior view of a surgical repair of an Achilles tendon according to another embodiment of the present invention. FIG. 14 further illustrates three plurality of sutures that have been tied across the rupture site, as well as a reinforcement suture traversing the most proximal aspect of the proximal stump to the most distal aspect of the distal stump. FIGS. 15A and 15B illustrate a flow diagram of a surgical repair of an Achilles tendon according to one embodiment of the present invention.

To begin closing the wound, a box suture is run from the proximal medial side of the tendon to the distal medial side, then from the distal lateral side to the proximal lateral side, and then back to the proximal medial side. For example, and not limitation, the box suture runs in a nonlocking fashion down the medial portion of the tendon repair, past the rupture site to the most distal point of the distal stump, crosses over to the lateral side, and runs up the lateral side all the way to the proximal lateral side, then the suture is thrown over to the proximal medial side and tied. The tendon is irrigated before the incision made in the peritenon is closed. In one embodiment, the peritenon incision is closed with an absorbable suture. For example, and not limitation, the absorbable suture includes a 2-0 VICRYL® suture. A subcutaneous suture is used to close the subcutaneous tissue, and staples are inserted to close the skin. The foot is placed in a splint with a slight plantarflexion and neutral inversion-eversion. Lastly, a subcutaneous suture and skin staples are inserted to seal the wound. In yet another embodiment, the wound is closed with a zip-tie or wound glue.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of surgically repairing a tendon comprising:
    placing a tourniquet around an extremity of a person, the extremity of the person including a ruptured tendon;
    inflating the tourniquet;
    creating a first incision over a midline of a tear of the ruptured tendon;
    removing adhesion and scar tissue from the ruptured tendon;
    engaging a proximal stump of the ruptured tendon with at least one clamp;
    running a first plurality of sutures through the ruptured tendon, wherein the first plurality of sutures runs from a proximal side of the ruptured tendon to a distal side of the ruptured tendon, wherein the first plurality of sutures runs from a top of the proximal stump to a bottom of the proximal stump;
    applying tension on the first plurality of sutures to create tension on the ruptured tendon;
    inserting a second plurality of sutures through the ruptured tendon, wherein the second plurality of sutures runs through a medial side and a lateral side of the proximal stump, wherein the second plurality of sutures is positioned to exit a mid-substance of the proximal stump;
    running a third plurality of sutures in a non-locking manner across a distal stump of the ruptured tendon, wherein the third plurality of sutures is inserted on a distal side of the distal stump and exits on a proximal side of the distal stump;
    creating a second incision in a posterior compartment of the ruptured tendon;
    plantarflexing a foot of the extremity;
    tying the third plurality of sutures sequentially from a first suture to a second suture, wherein the first suture is a suture of the third plurality of sutures that is furthest from the ruptured tendon, wherein the second suture is a suture of the third plurality of sutures that is closest to the ruptured tendon;
    running the second plurality of sutures from a tip of the distal stump to a rupture site of the ruptured tendon, wherein the second plurality of sutures is run in a medial direction and a lateral direction;
    creating a third incision in a medial direction and a lateral direction at an insertion junction, wherein the insertion junction is where the ruptured tendon inserts into a calcaneus;
    running a box suture from a proximal medial side of the ruptured tendon to a distal medial side of the ruptured tendon, wherein the box suture further runs to a distal lateral side of the ruptured tendon and to a proximal lateral side of the ruptured tendon, wherein the box suture further runs to the proximal medial side of the ruptured tendon;
    tying the box suture;

irrigating the ruptured tendon;
closing the first incision with a first incision suture;
inserting a second incision suture to close a subcutaneous area around the ruptured tendon; and
inserting staples into skin surrounding the tendon.

2. The method of claim 1, wherein the ruptured tendon is an Achilles tendon.

3. The method of claim 1, wherein the person is in a prone position.

4. The method of claim 1, wherein the first incision is made through a peritenon of the ruptured tendon.

5. The method of claim 1, wherein the at least one clamp includes an Allis clamp.

6. The method of claim 1, wherein the third plurality of sutures comprises a material, wherein the material comprises polydioxanone.

7. The method of claim 1, wherein the second plurality of sutures include a tape suture or a wide suture, wherein the tape suture or the wide suture is positioned on a proximal side of the second suture of the third plurality of sutures.

8. The method of claim 1, wherein the first plurality of sutures, the second plurality of sutures, and/or the third plurality of sutures include a 6-core non-locking suture strand.

9. The method of claim 1, wherein tying of the second plurality of sutures creates a plurality of knots, wherein at least one knot of the plurality of knots is positioned around the tear of the ruptured tendon.

10. A method of repairing a tendon comprising:
placing a tourniquet around an extremity of a person, the extremity of the person including a ruptured tendon;
inflating the tourniquet;
creating a first incision over a midline of a tear of the ruptured tendon;
removing adhesion and scar tissue from the ruptured tendon;
engaging a proximal stump of the ruptured tendon with at least one clamp;
running a first plurality of sutures through the ruptured tendon, wherein the first plurality of sutures runs from a proximal side of the ruptured tendon to a distal side of the ruptured tendon, wherein the first plurality of sutures run from a top of the proximal stump to a bottom of the proximal stump;
applying tension on the first plurality of sutures to create tension on the ruptured tendon;
inserting a second plurality of sutures through the tendon, wherein the second plurality of sutures runs through a medial side of the proximal stump and a lateral side of the proximal stump, wherein the second plurality of sutures are positioned to exit a mid-substance of the proximal stump;
running a third plurality of sutures in a non-locking manner across a distal stump of the ruptured tendon, wherein the third plurality of sutures is inserted on a distal side of the distal stump and exits on a proximal side of the distal stump;
creating a second incision in a posterior compartment of the ruptured tendon;
plantarflexing a foot of the ruptured tendon;
tying the third plurality of sutures sequentially from a first suture to a second suture, wherein the first suture is a suture of the third plurality of sutures that is furthest from the ruptured tendon, wherein the second suture is a suture of the third plurality of sutures that is closest to the ruptured tendon;
running the second plurality of sutures in a lateral direction from a tip of the distal stump of the ruptured tendon to a rupture site of the ruptured tendon;
creating a third incision in a medial direction and a lateral direction at an insertion junction, wherein the insertion junction is where the ruptured tendon inserts into a calcaneus;
running the second plurality of sutures through the third incision, wherein the second plurality of sutures further runs through the ruptured tendon, wherein the second plurality of sutures exits through the first incision and runs back up the medial side of the ruptured tendon, wherein the second plurality of sutures are tied at the rupture site;
running a box suture from a proximal medial side of the ruptured tendon to a distal medial side of the ruptured tendon, wherein the box suture further passes to a distal lateral side of the ruptured tendon and to a proximal lateral side of the ruptured tendon, wherein the box suture is passed to the proximal medial side of the ruptured tendon;
tying the box suture;
irrigating the ruptured tendon;
closing the first incision with a first incision suture;
closing subcutaneous tissue around the ruptured tendon with a subcutaneous suture; and
inserting staples into skin surrounding the ruptured tendon.

11. The method of claim 10, wherein about two-thirds of the first incision is positioned over the proximal stump of the ruptured tendon and about one-third of the first incision is positioned over the rupture site of the ruptured tendon.

12. The method of claim 10, wherein the first incision suture is an absorbable suture.

13. The method of claim 10, wherein the ruptured tendon is an Achilles tendon, wherein the foot of the extremity is placed into a splint after the insertion of the staples, wherein the foot is positioned into plantarflexion when inserted into the splint.

14. The method of claim 10, wherein the first incision is between about two centimeters and about three centimeters.

15. The method of claim 10, wherein the first plurality of sutures, the second plurality of sutures, and the third plurality of sutures are nonabsorbable.

16. A method of repairing a tendon using an anchor, the method comprising:
placing a tourniquet around an extremity of a person, the extremity of the person including a ruptured Achilles tendon;
inflating the tourniquet;
creating a first incision over a midline of a tear of the ruptured Achilles tendon;
removing adhesion and scar tissue from the ruptured Achilles tendon;
engaging a proximal stump of the ruptured Achilles tendon with at least one clamp;
running a first plurality of sutures through the ruptured Achilles tendon, wherein the first plurality of sutures runs from a proximal side of the ruptured Achilles tendon to a distal side of the ruptured Achilles tendon, wherein the first plurality of sutures run from a top of the proximal stump to a bottom of the proximal stump;
applying tension on the first plurality of sutures to create tension on the ruptured Achilles tendon;
inserting a second plurality of sutures through the ruptured Achilles tendon, wherein the second plurality of sutures runs through a medial side and a lateral side of the proximal stump, wherein the second plurality of sutures are positioned to exit a mid-substance of the proximal stump;

running a third plurality of sutures in a non-locking manner across a distal stump of the ruptured Achilles tendon, wherein the third plurality of sutures is inserted on a distal side of the distal stump and exits on a proximal side of the distal stump;

creating a second incision in a posterior compartment of the ruptured Achilles tendon;

plantarflexing a foot of the extremity;

tying the third plurality of sutures sequentially from a first suture to a second suture to create a plurality of knots, wherein the first suture is a suture of the third plurality of sutures that is furthest from the ruptured Achilles tendon, wherein the second suture is a suture of the third plurality of sutures that is closest to the ruptured Achilles tendon, wherein at least one knot of the plurality of knots is positioned near a rupture site;

running the second plurality of sutures from a tip of the distal stump to the rupture site in a medial direction and a lateral direction;

creating a third incision in a medial direction and a lateral direction at an insertion junction, wherein the insertion junction is where the ruptured Achilles tendon inserts into a calcaneus;

inserting an anchor at the calcaneus, wherein the anchor is positioned through each of the first incision, the second incision, and the third incision;

running a box suture from a proximal medial side of the ruptured Achilles tendon to a distal medial side of the ruptured Achilles tendon, wherein the box suture further runs to a distal lateral side of the ruptured Achilles tendon and to a proximal lateral side of the ruptured Achilles tendon, wherein the box suture is further passed to the proximal medial side of the ruptured Achilles tendon;

tying the box suture;

irrigating the ruptured Achilles tendon;

closing the first incision with a first incision suture;

closing subcutaneous tissue around the ruptured Achilles tendon with a subcutaneous suture; and inserting staples into skin surrounding the ruptured Achilles tendon.

17. The method of claim 16, wherein the first plurality of knots includes at least six knots.

18. The method of claim 16, wherein tying the box suture creates a second plurality of knots.

19. The method of claim 16, wherein at least one of the first plurality of sutures, the second plurality of sutures, or the third plurality of sutures includes nonabsorbable sutures.

20. The method of claim 16, wherein about two-thirds of the first incision is positioned over the proximal stump of the ruptured Achilles tendon and about one-third of the first incision is positioned over the rupture site of the ruptured Achilles tendon.

* * * * *